(12) United States Patent
Zhang

(10) Patent No.: US 12,555,647 B2
(45) Date of Patent: Feb. 17, 2026

(54) METHOD FOR TRAINING VECTOR MODEL AND GENERATING NEGATIVE SAMPLE

(71) Applicant: BOE Technology Group Co., Ltd., Beijing (CN)

(72) Inventor: Zhenzhong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 583 days.

(21) Appl. No.: 18/018,858

(22) PCT Filed: Jan. 4, 2022

(86) PCT No.: PCT/CN2022/070041
§ 371 (c)(1),
(2) Date: Jan. 30, 2023

(87) PCT Pub. No.: WO2023/130200
PCT Pub. Date: Jul. 13, 2023

(65) Prior Publication Data
US 2024/0265993 A1    Aug. 8, 2024

(51) Int. Cl.
*G06F 16/00*   (2019.01)
*G06N 3/08*   (2023.01)
*G16B 5/00*   (2019.01)
*G16B 40/20*   (2019.01)

(52) U.S. Cl.
CPC ............. *G16B 5/00* (2019.02); *G06N 3/08* (2013.01); *G16B 40/20* (2019.02)

(58) Field of Classification Search
CPC ................................ G16B 40/20; G06N 3/08
USPC ............................................................ 706/25
See application file for complete search history.

(56) References Cited

U.S. PATENT DOCUMENTS

2021/0166780 A1* 6/2021 Adams ............... C07K 16/00
                                                                  707/707

FOREIGN PATENT DOCUMENTS

| CN | 109949859 A | 6/2019 |
| CN | 110853702 A | 2/2020 |
| CN | 111613273 A | 9/2020 |
| CN | 112270958 A | 1/2021 |

* cited by examiner

*Primary Examiner* — Alexandria Y Bromell
(74) *Attorney, Agent, or Firm* — Arch & Lake LLP

(57) ABSTRACT

A method for training a vector model, including: obtaining more than one RNA sequence and more than one protein sequence; obtaining more than one first RNA vector by vectorizing the more than one RNA sequence; obtaining more than one first protein vector by vectorizing the more than one protein sequence; determining an interaction between the RNA sequence and the protein sequence according to the first RNA vector and the first protein vector; obtaining a similarity of more than one RNA-RNA pair by calculating a distance between any two RNA sequences; obtaining a similarity of more than one protein-protein pair by calculating a distance between any two protein sequences; training the vector model according to an interaction between the RNA sequence and the protein sequence, the similarity of the RNA-RNA pair and the similarity of the protein-protein pair.

19 Claims, 8 Drawing Sheets

METHOD FOR TRAINING VECTOR MODEL AND GENERATING NEGATIVE SAMPLE

CROSS REFERENCE

The present disclosure is a National Stage of International Application No. PCT/CN2022/070041 filed on Jan. 4, 2022, the entire contents of which are incorporated herein by reference.

TECHNICAL FIELD

The present disclosure relates to the technical field of artificial intelligence, in particular, to a method for training a vector model, a method for generating a negative sample, a computer-readable storage medium, and an electronic device.

BACKGROUND

In modern biological research, with the deepening of functional genome research, the biological function research of biomolecules has a very important position, and the interaction analysis of biomolecules has become an indispensable and important means in the research of biomolecular functions.

Taking Ribonucleic acid (abbreviated RNA) as an example, noncoding RNA (ncRNA) participates in many complex cellular processes, plays an important role in life processes such as alternative splicing, chromatin modification, and epigenetics, and is closely related to many diseases. Studies have shown that most noncoding RNAs achieve their regulatory functions by interacting with proteins. Therefore, studying the interaction between noncoding RNA and protein is of great significance for revealing the molecular mechanism of noncoding RNA in human diseases and life activities, and has become one of the important ways to analyze the function of noncoding RNA and protein.

It should be noted that the information disclosed in the above background part is only for enhancing the understanding of the background of the present disclosure, and thus may include information that does not constitute the prior art known to those of ordinary skill in the art.

SUMMARY

The present disclosure provides a method for training a vector model, and a method for generating a negative sample.

The present disclosure provides a method for training a vector model, including:
  obtaining more than one RNA sequence and more than one protein sequence;
  obtaining more than one first RNA vector by vectorizing the more than one RNA sequence;
  obtaining more than one first protein vector by vectorizing the more than one protein sequence;
  determining an interaction between the RNA sequence and the protein sequence according to the first RNA vector and the first protein vector;
  obtaining a similarity of more than one RNA-RNA pair by calculating a distance between any two RNA sequences;
  obtaining a similarity of more than one protein-protein pair by calculating a distance between any two protein sequences; and
  training the vector model according to the interaction between the RNA sequence and the protein sequence, the similarity of the RNA-RNA pair and the similarity of the protein-protein pair.

In some embodiments of the present disclosure, the obtaining the more than one first RNA vector by vectorizing the more than one RNA sequence includes:
  converting each RNA sequence into N base k-mer subsequences; and
  obtaining the first RNA vector by vectorizing each of the base k-mer subsequences.

In some embodiments of the present disclosure, the obtaining the first RNA vector by vectorizing each of the base k-mer subsequences includes:
  obtaining first vectors of the N base k-mer subsequences by encoding each of the base k-mer subsequences;
  inputting the first vectors of the N base k-mer subsequences into a recurrent neural network to output N base k-mer vectors; and obtaining the first RNA vector according to the N base k-mer vectors.

In some embodiments of the present disclosure, the obtaining the more than one first protein vector by vectorizing the more than one protein sequence includes:
  converting each protein sequence into M amino acid k-mer subsequences; and
  obtaining the first protein vector by vectorizing each of the amino acid k-mer subsequences.

In some embodiments of the present disclosure, the obtaining the first protein vector by vectorizing each of the amino acid k-mer subsequences includes:
  obtaining first vectors of the M amino acid k-mer subsequences by encoding each of the amino acid k-mer subsequences;
  inputting the M amino acid k-mer subsequences into the recurrent neural network to output M amino acid k-mer vectors; and obtaining the first protein vector according to the M amino acid k-mer vectors.

In some embodiments of the present disclosure, the determining the interaction between the RNA sequence and the protein sequence according to the first RNA vector and the first protein vector includes:
  calculating, according to:

$$p(1 \mid (v^R, v^P)) = \frac{1}{1 + e^{(\theta \cdot (v^R, v^P))}},$$

a probability value of presence of the interaction between the RNA sequence and the protein sequence; and determining the interaction between the RNA sequence and the protein sequence according to the probability value; where, $\theta$ is a model parameter, $v^R$ is the first RNA vector, and $v^P$ is the first protein vector.

In some embodiments of the present disclosure, the obtaining the similarity of more than one RNA-RNA pair by calculating the distance between any two RNA sequences includes:
  calculating an edit distance between any two RNA sequences, and obtaining a sequence distance between any two RNA sequences according to the edit distance; and
  obtaining the similarity of more than one RNA-RNA pair according to the sequence distance between any two RNA sequences.

In some embodiments of the present disclosure, the obtaining the similarity of more than one protein-protein pair by calculating the distance between any two protein sequences includes:

obtaining more than one protein vector by mapping more than one protein sequence into a vector space; and obtaining the similarity of more than one protein-protein pair by calculating the distance between any two protein vectors.

In some embodiments of the present disclosure, the training the vector model according to the interaction between the RNA sequence and the protein sequence, the similarity of the RNA-RNA pair and the similarity of the protein-protein pair, includes:

constructing an objective function according to the interaction between the RNA sequence and the protein sequence, the similarity of the RNA-RNA pair and the similarity of the protein-protein pair; and updating a model parameter of the vector model iteratively based on the objective function using a stochastic gradient descent algorithm, and completing training of the vector model when an iteration termination condition is satisfied.

The present disclosure provides a method for generating a negative sample, including:

obtain a positive RNA-protein pair;

obtaining, by vectorizing a target RNA sequence and a target protein sequence in the positive RNA-protein pair through a trained vector model, a corresponding second RNA vector and second protein vector; and obtaining, based on the second RNA vector and the second protein vector, a target negative RNA-protein pair corresponding to the positive RNA-protein pair, where the target negative RNA-protein pair is used for training a prediction model for RNA-protein interaction.

In some embodiments of the present disclosure, the obtaining, based on the second RNA vector and the second protein vector, the target negative RNA-protein pair corresponding to the positive RNA-protein pair, includes:

calculating a similarity between the target RNA sequence and any RNA sequence except for the target RNA sequence;

obtaining a candidate RNA sequence by screening the any RNA sequence except for the target RNA sequence according to the similarity;

calculating a relationship score between the candidate RNA sequence and the target protein sequence according to the second RNA vector of the candidate RNA sequence and the second protein vector of the target protein sequence; and determining the target negative RNA-protein pair according to the relationship score between the candidate RNA sequence and the target protein sequence.

In some embodiments of the present disclosure, the calculating the relationship score between the candidate RNA sequence and the target protein sequence according to the second RNA vector of the candidate RNA sequence and the second protein vector of the target protein sequence includes:

calculating the relationship score between the candidate RNA sequence and the target protein sequence, based on a model parameter of the vector model and according to the second RNA vector of the candidate RNA sequence and the second protein vector of the target protein sequence;

where, the model parameter is obtained by training the vector model.

In some embodiments of the present disclosure, the determining the target negative RNA-protein pair according to the relationship score between the candidate RNA sequence and the target protein sequence includes:

obtaining, when the relationship score between the candidate RNA sequence and the target protein sequence satisfies a preset condition, a first negative example set from the candidate RNA sequence; and determining the target negative example RNA-protein pair according to the first negative example set.

In some embodiments of the present disclosure, the obtaining, based on the second RNA vector and the second protein vector, the target negative RNA-protein pair corresponding to each the positive RNA-protein pair, includes:

calculating a similarity between the target protein sequence and any protein sequence except for the target protein sequence;

obtaining a candidate protein sequence by screening the any protein sequence except for the target protein sequence according to the similarity;

calculating the relationship score between the candidate protein sequence and the target RNA sequence according to the second protein vector of the candidate protein sequence and the second RNA vector of the target RNA sequence; and determining the target negative RNA-protein pair according to the relationship score between the candidate protein sequence and the target RNA sequence.

In some embodiments of the present disclosure, the method further includes:

obtaining a training data set including more than one RNA-protein pair;

determining an interaction between an RNA sequence and a protein sequence in the training data set, a similarity of an RNA-RNA pair and a similarity of a protein-protein pair through the vector model;

constructing an objective function according to the interaction between the RNA sequence and the protein sequence, the similarity of the RNA-RNA pair, and the similarity of the protein-protein pair;

updating a model parameter of the vector model iteratively based on the objective function using a stochastic gradient descent algorithm and completing training of the vector model when an iteration termination condition is satisfied.

The present disclosure provides a method for generating a negative sample, including:

obtaining a positive sample, where the positive sample includes two biomolecular sequences;

obtaining, by vectorizing a first biomolecule sequence in the positive sample through a trained network model, a biomolecule vector of the first biomolecule sequence;

calculating a similarity between the biomolecule vector of the first biomolecule sequence and a biomolecule vector of any homologous biomolecule sequence except for the first biomolecule sequence;

determining a homologous target biomolecule sequence similar to the first biomolecule sequence according to the similarity; and obtaining a negative sample corresponding to the positive sample from the homologous target biomolecule sequence and a second biomolecule sequence in the positive sample.

In some embodiments of the present disclosure, the first biomolecule sequence is an RNA sequence, and the biomolecule vector is a third RNA vector; and the obtaining, by vectorizing the first biomolecule sequence in the positive sample through a trained network model, the biomolecule vector of the first biomolecule sequence, includes:

converting each RNA sequence into N base k-mer subsequences; and obtaining the third RNA vector by vectorizing each of the k-mer subsequences through the trained network model.

In some embodiments of the present disclosure, the obtaining the third RNA vector by vectorizing each of the k-mer subsequences through the trained network model includes:

obtaining first vectors of the N base k-mer subsequences by encoding each of the base k-mer subsequences;

inputting the first vectors of the N base k-mer subsequences into a pre-trained model to output N base k-mer vectors; and obtaining the third RNA vector according to the N base k-mer vectors.

In some embodiments of the present disclosure, the calculating the similarity between the biomolecule vector of the first biomolecule sequence and the biomolecule vector of any homologous biomolecule sequence except for the first biomolecule sequence includes: calculating, according to:

$$S(Vr_j, Vr_i) = \frac{\langle Vr_j, Vr_i \rangle}{\sqrt{\langle Vr_j, Vr_j \rangle}\sqrt{\langle Vr_i, Vr_i \rangle}},$$

a similarity between two third RNA vectors $Vr_i$ and $Vr_j$; where, $Vr_i$ represents the third RNA vector of the RNA sequence $r_i$, and $Vr_j$ represents the third RNA vector of the RNA sequence $r_j$.

In some embodiments of the present disclosure, the first biomolecular sequence is a protein sequence, and the biomolecular vector is a third protein vector; and the obtaining, by vectorizing the first biomolecule sequence in the positive sample through the trained network model, the biomolecule vector of the first biomolecule sequence, includes:

converting each protein sequence into M amino acid k-mer subsequences; and obtaining the third protein vector by vectorizing each of the amino acid k-mer subsequences through the trained network model.

It should be understood that the above general description and the following detailed description are only illustrative and explanatory, and do not limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Apparently, the drawings in the following description are only some embodiments of the present disclosure, and those skilled in the art can also obtain other drawings according to these drawings without creative efforts.

DETAILED DESCRIPTION

Figure 1:
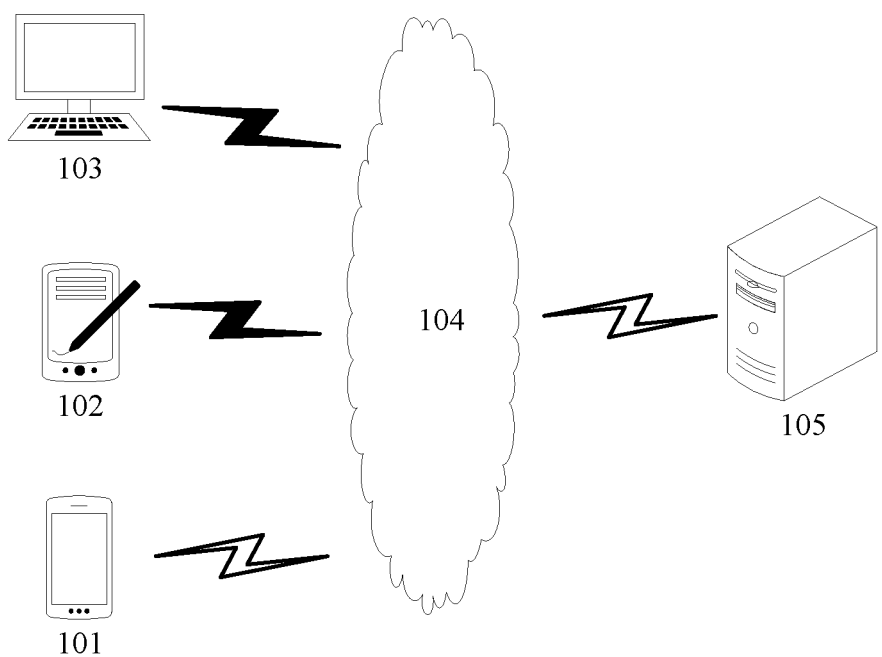
FIG. 1 shows a schematic diagram of an exemplary system architecture in which a method for training a vector model, a method for generating a negative sample and an apparatus according to some embodiments of the present disclosure can be applied.

Example embodiments will now be described more fully with reference to the accompanying drawings. Example embodiments may, however, be embodied in many forms and should not be construed as limited to the examples set forth here; rather, these embodiments are provided so that the present disclosure will be thorough and complete and will fully convey the concept of example embodiments to those skilled in the art. The described features, structures, or characteristics may be combined in any suitable manner in one or more embodiments. In the following description, numerous specific details are provided in order to give a thorough understanding of embodiments of the present disclosure. However, those skilled in the art will appreciate that the technical solutions of the present disclosure may be practiced with one or more of the specific details being omitted, or other methods, components, devices, steps, etc. may be adopted. In other instances, well-known technical solutions have not been shown or described in detail to avoid obscuring aspects of the present disclosure.

Furthermore, the drawings are merely schematic illustrations of the present disclosure and are not necessarily drawn to scale. The same reference numerals in the drawings represent the same or similar parts, and thus repeated descriptions of them will be omitted. Some of the block diagrams shown in the drawings are functional entities and do not necessarily correspond to physically or logically separate entities. These functional entities may be implemented in software, or in one or more hardware modules or integrated circuits, or in different network and/or processor means and/or microcontroller means.

FIG. 1 shows a schematic diagram of a system architecture of an exemplary application environment in which a method for training a vector model, a for generating a negative sample and an apparatus according to some embodiments of the present disclosure can be applied.

As shown in FIG. 1, the system architecture 100 may include one or more of terminal devices 101, 102, 103, a network 104 and a server 105. The network 104 is taken as a medium for providing communication links between the terminal devices 101, 102, 103 and the server 105. The network 104 may include various connection types, such as wires communication links, wireless communication links, or fiber optic cables, etc. The terminal devices 101, 102, 103 may be various electronic devices, including but not limited to desktop computers, portable computers, smart phones, and tablet computers. It should be understood that the numbers of terminal devices, networks and servers in FIG. 1 are only illustrative. According to the implementation needs, there can be any number of terminal devices, networks and servers. For example, the server 105 may be one server, or a server cluster composed of more than one server, or a cloud computing platform or a virtualization center. Specifically, the server 105 can be used to execute: obtaining more than one RNA sequence and more than one protein sequence; obtaining more than one first RNA vector by vectorizing the more than one RNA sequence; obtaining more than one first protein vector by vectorizing the more than one protein sequence; determining an interaction between the RNA sequence and the protein sequence according to the first RNA vector and the first protein vector; calculating a distance between any two RNA sequences to obtain the similarity of more than one RNA-RNA pairs; calculating a distance between any two protein sequences to obtain the similarity of more than one protein-protein pairs; training the vector model according to the interaction between the RNA sequence and the protein sequence, the similarity of the RNA-RNA pair and the similarity of the protein-protein pair, and generating a target negative sample for training a prediction model for RNA-protein interaction using the trained vector model.

The method for training a vector model and the method for generating a negative sample provided by the embodiments of the present disclosure are generally executed by the server 105. Correspondingly, the apparatus for training a vector model and the apparatus for generating a negative sample are generally set in the server 105, and the server can send the RNA vector and the protein vector output by the vector model, as well as the generated negative sample to the terminal device, which will be displayed to the user by the terminal device. However, those skilled in the art can easily understand that the method for training a vector model and the method for generating a negative sample provided by the embodiments of the present disclosure can also be executed by one or more of the terminal devices 101, 102, 103. Correspondingly, the apparatus for training a vector model and the apparatus for generating a negative sample can also be set in the terminal equipment 101, 102, 103. For example, after being executed by the terminal device, the RNA vector and protein vector output by the vector model, and the generated negative samples can be directly displayed on the display screen of the terminal device, which is not specifically limited in the exemplary embodiments.

The technical solutions of the embodiments of the present disclosure are described in detail below:

In the exemplary embodiments of the present disclosure, biomolecule RNA and protein may be taken as examples for illustration. At present, the prediction of the interaction between RNA and protein can be modeled as a classification problem, and the classification model can be used to predict the interaction between RNA and protein. Before using the classification model to predict the interaction between RNA and protein, it is necessary to use the training data set containing positive samples (RNA-protein pairs with interaction) and negative samples (RNA-protein pairs without interaction) to train the classification model to improve the predicting ability of the classification model. Moreover, it is also necessary to ensure that the training data set contains a sufficient number of positive samples and negative samples.

If the training data set contains only positive samples, a series of negative samples need to be generated to improve the performance of the classification model. For example, negative samples can often be generated by random sampling. For example, for a positive sample $(r_1, p_1)$, the protein $p_1$ can be fixed, an RNA $r_2$ can be randomly selected from the training data set, and $(r_2, p_1)$ can be taken as a negative sample. However, the quality of the negative samples generated by this method is not high, that is, the discrimination of the negative samples is not high, which means that the negative samples are easy to distinguish from the positive samples. A higher-quality negative sample should be similar to the positive sample, and the sample is indeed a negative sample. For example, for the positive sample $(r_1, p_1)$, after fixing the protein $p_1$, one $r_2$ can be found causing that $r_2$ is similar to $r_1$ and there is no interaction between $r_2$ and $p_1$, $(r_2, p_1)$ is a negative sample of higher quality. Understandably, classification models trained with low-quality negative samples perform poorly. For example, after a negative sample that is more similar to a positive sample is input into the classification model, the classification model easily predicts the negative sample as a positive sample, indicating that the accuracy for predicting the interaction between RNA-protein is low.

Figure 2:
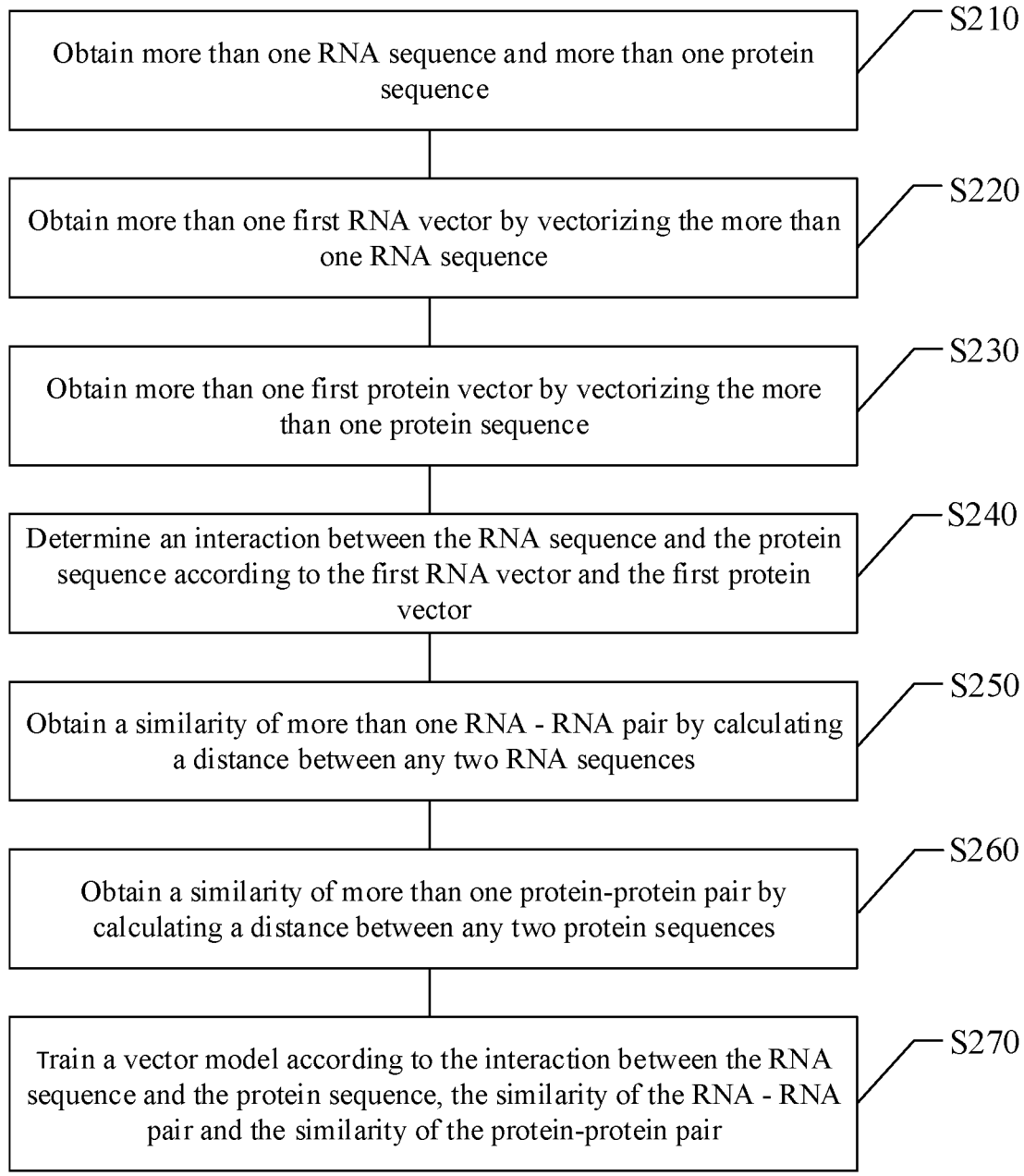
FIG. 2 schematically shows a flow chart of a method for training a vector model according to some embodiments of the present disclosure.

Based on the above-mentioned one or more problems, the example embodiment provides a method for training a vector model, which can be applied to the above-mentioned server 105, and can also be applied to one or more of the above-mentioned terminal devices 101, 102, 103. This is not specifically limited in the example embodiments. With reference to shown in FIG. 2, this method for training a vector model can include following steps S210 to step S270:

In step S210, more than one RNA sequence and more than one protein sequence are obtained;

In step S220, more than one first RNA vector is obtained by vectorizing the more than one RNA sequence;

In step S230, more than one first protein vector is obtained by vectorizing the more than one protein sequence;

In step S240, an interaction between the RNA sequence and the protein sequence is determined according to the first RNA vector and the first protein vector;

In step S250, a similarity of more than one RNA-RNA pair is obtained by calculating a distance between any two RNA sequences;

In step S260, a similarity of more than one protein-protein pair is obtained by calculating a distance between any two protein sequences;

In step S270, the vector model is trained according to the interaction between the RNA sequence and the protein sequence, the similarity of the RNA-RNA pair and the similarity of the protein-protein pair.

In the method for training the vector model provided by the exemplary embodiments of the present disclosure, by obtaining more than one RNA sequence and more than one protein sequence, more than one first RNA vector is obtained by vectorizing the more than one RNA sequence; more than one first protein vector is obtained by vectorizing the more than one protein sequence; an interaction between the RNA sequence and the protein sequence is determined according to the first RNA vector and the first protein vector; a similarity of more than one RNA-RNA pair is obtained by calculating a distance between any two RNA sequences; a similarity of more than one protein-protein pair is obtained by calculating a distance between any two protein sequences; the vector model is trained according to the interaction between the RNA sequence and the protein sequence, the similarity of the RNA-RNA pair and the similarity of the protein-protein pair. In the present disclosure, vector model learning is supervised by using three kinds of information of similarity of RNA-RNA, similarity of protein-protein similarity and interaction between RNA-protein, so that the RNA vector and protein vector output by the vector model can accurately reflect the interaction between RNA and protein, the similarity of RNA and RNA, and the similarity of protein and protein; when using the vector model trained based on multi-task learning to generate a negative sample, it can ensure that the negative sample is similar to the known positive sample, which improves the quality of the negative sample.

Next, the above-mentioned steps of the exemplary embodiments will be described in more detail.

In step S210, more than one RNA sequence and more than one protein sequence are obtained.

In the exemplary embodiments of the present disclosure, a data set can be obtained, and the data set can contain at least one RNA-protein pair composed of an RNA sequence and a protein sequence, and the interaction between the RNA sequence and the protein sequence in each RNA-protein pair is known. It can be understood that, in order to generate negative examples similar to positive examples, the data set can only consist of more than one positive example. Positive examples refer to RNA-protein pairs with interactions between RNA sequences and protein sequences, and negative examples refers to RNA-protein pairs in which there is no interaction between the RNA sequence and the protein sequence. In some cases, the data set can also consist of only more than one negative example or consist of both positive examples and negative examples. It can be understood that any number of RNA sequences and protein sequences can be included in the obtained data set. For example, all RNA sequences and all protein sequences can be obtained, and all RNA sequences and all protein sequences are arranged and combined to form a data set containing several RNA-protein pairs. It is also possible to obtain partial RNA sequences and partial protein sequences, and arrange and combine partial RNA sequences and partial protein sequences to obtain a data set containing more than one RNA-protein pair, which is not specifically limited in the present disclosure.

In some embodiments, the obtained more than one RNA sequence and more than one protein sequence may constitute more than one RNA-protein pair. RNA-protein pairs can be obtained from any data set, and more than one RNA sequence and more than one protein sequence can be obtained from different data sets, as long as whether there is an interaction between the obtained RNA sequence and protein sequence pair is known. In some embodiments, there is an interaction relationship between the obtained RNA sequence and protein sequence, for example, each obtained RNA-protein pair is a positive example. In some cases, each RNA-protein pair obtained can also be a negative example, or consist of both positive examples and negative examples.

Among them, the interaction between RNA and protein means that the function of protein is reflected in the interaction with RNA. For example, the interaction between protein and RNA plays an important role in protein synthesis. At the same time, many functions of RNA cannot be performed without the interaction with protein. The interaction can be regulation, guidance, etc., and is not limited here. For example, in the presence of an interaction, RNA can guide protein synthesis, or RNA can regulate protein function. The interaction between RNA and protein can also mean that the two can regulate each other's life cycle and function through physical interaction. For example, the RNA coding sequence can guide protein synthesis, and correspondingly, the protein can also regulate the expression and function of RNA.

For example, during the training process, more than one RNA sequence and more than one protein sequence need to be input, that is, more than one RNA-protein pair need to be input. More than one RNA-protein pair can be input individually, in batches, or all at once. Users can input each RNA-protein pair through the terminal device. For example, the user can manually input each RNA-protein pair, or input each RNA-protein pair by voice; for example, an RNA sequence can be input, and then a protein sequence can be input, and there is no limit to the input order of the two; for example, an RNA sequence and a protein sequence can be input into different text boxes, or can be input into a same text box, which is not limited in the embodiments.

During the training process or after the training is completed, some/all training parameters, some/all intermediate results or final results can be output, such as a first RNA vector, a first protein vector, a similarity of RNA-RNA pair, a similarity of protein-protein pair, etc. For example, it may be output to a terminal device for viewing by the user. For example, it may be directly displayed on the display screen of the terminal device, or provided to the user in the form of voice broadcast, which is not limited in the embodiments. In some embodiments, the above content may also be saved for subsequent direct retrieval.

In the process of generating negative examples, the user can input each positive example RNA-protein pair through the terminal device. For example, the user can input each positive example RNA-protein pair manually, or input each positive example RNA-protein pair by voice; for example, an RNA sequence can be input, then a protein sequence can be input, and there is no limit to the input order of the two; for example, RNA sequence and protein sequence can be input into different text boxes, or can be entered into a same text box, which is not limited in the embodiments.

For example, more than one positive example RNA-protein pair can be obtained, and each positive example RNA-protein pair can be vectorized to obtain the corresponding RNA vector and protein vector, so as to generate the corresponding negative example RNA-protein pair using the RNA vector and protein vector. At the same time, the generated negative example RNA-protein pair can also be output to the terminal device for users to view. For example, the generated negative example RNA-protein pair can be directly displayed on the display screen of the terminal device, or the generated negative example RNA-protein pair can be provided to the user through voice broadcast, which is not limited in the embodiments.

In the exemplary embodiments of the present disclosure, the vector model used to obtain the vector representation of the RNA sequence and the vector representation of the protein sequence can be composed of two parts of the model, the first part of the model is used to vectorize the RNA sequence and the protein sequence, and the second part of the model is used to determine the interaction between the RNA sequence and the protein sequence. For example, the first part of the model can be a neural network such as a recurrent neural network, an Embedding (vector mapping) network, etc., or a BERT (bidirectionally encoded representation from a transformer) encoder, or a One-Hot encoding, and the like. The second part of the model may be a logistic regression model, an SVM (Support Vector Machine), a decision tree, etc., which is not limited in the present disclosure. For example, the first part of the model may also include two parts: a model for vectorizing the RNA sequence and a model for vectorizing the protein sequence.

In step S220, more than one first RNA vector is obtained by vectorizing the more than one RNA sequence.

In an example implementation, description may be made by taking the first part of the model in the vector model as a neural network as an example. For example, the RNA sequence in each RNA-protein pair can be vectorized by a first neural network to obtain the first RNA vector corresponding to each RNA sequence, so as to determine the interaction of the more than one RNA-protein pair according to the first RNA vector and the first protein vector, and then the entire vector model can be trained according to the interaction of the RNA-protein pair combined with the similarity of the RNA-RNA pair and the similarity of the protein-protein pair, and the trained vector model can be used to generate a negative example RNA-protein pair corresponding to each positive example RNA-protein pair. The first neural network in the exemplary embodiments of the present disclosure may be an Embedding network, may also be a recurrent neural network, or may be a network structure composed of the Embedding network and the recurrent neural network. Among them, the recurrent neural network can be an LSTM (Long Short-Term Memory) network, or a bidirectional recurrent neural network, a GRU (Gated Recurrent Unit,) network, etc., which are not specifically limited in the present disclosure.

the present disclosure, an RNA sequence may be represented by a base sequence, for example, an RNA sequence may be represented as AGCAUAGCACCU . . . . For an RNA sequence, four bases can be included, namely adenine (A), uracil (U), guanine (G) and cytosine (C). Correspondingly, the base k-mer subsequence can also be used to represent the RNA sequence. Among them, the k-mer subsequence refers to a k-complex composed of k bases or k kinds of amino acids as a group. Specifically, all base k-mer subsequences can be obtained by arranging and combining four kinds of bases, and 4 k base k-mer subsequences can be obtained for a certain value of k. For example, when k is 3, there are 4 3=64 kinds of base 3-mer subsequences, and when k is 4, there are 4 4=256 kinds of base 4-mer subsequences. For example, AGC, AUA, GCA and CCU are four kinds of different base 3-mer subsequences, and AGCA, UAGC and ACCU are three kinds of different base 4-mer subsequences. Therefore, the RNA sequence AGCAUAGCACCU . . . may be represented as {AGC, AUA, GCA, CCU, . . . }, or may be represented as {AGCA, UAGC, ACCU, . . . }. In other examples, the RNA sequence can also be read in an overlapping manner to obtain the corresponding base 3-mer subsequences or base 4-mer subsequences. Correspondingly, the base 3-mer subsequence of the RNA sequence may also include AGC, GCA, CAU, AUA, etc., and the base 4-mer subsequence of the RNA sequence may also include AGCA, GCAU, CAUA, etc., the present disclosure is not limited to this. In some embodiments of the present disclosure, k is a positive integer, such as 1, 2, 3 . . . , k can take one or more values, and the specific value of k can be adjusted according to actual conditions, which is not limited here.

When each RNA sequence is encoded through the first neural network, part of the bases of the RNA sequence can be encoded, so as to obtain the first RNA vector according to the encoding result of the part of the bases. It is also possible to encode all bases of the RNA sequence, so as to obtain the first RNA vector according to the encoding results of all bases. It is also possible to encode all the bases of the RNA sequence, and select the encoding results of part of the bases to obtain the first RNA vector according to the encoding results of the part of the bases, which is not specifically limited in the present disclosure.

In exemplary embodiments of the present disclosure, it is described by taking encoding of all bases of each RNA sequence and obtaining the first RNA vector according to all encoded bases as an example. Each RNA sequence can be converted to an N base k-mer subsequences. Taking any RNA sequence as an example, according to the value of k, consecutive k bases can be sequentially taken from the first base of the RNA sequence to form a base k-mer subsequence of the RNA sequence; until the last k bases in the RNA sequence are taken, all base k-mer subsequences of the RNA sequence are obtained. Then, each base k-mer subsequence can be vectorized through the first neural network to obtain N base k-mer vectors, and the first RNA vector can be obtained according to the N base k-mer vectors. For example, the RNA sequence can be divided into N base k-mer subsequences without overlapping. For example, if the RNA sequence is AUCUGAAAU, it can be divided into three base k-mer subsequences, namely AUC, UGA and AAU. In other examples, the RNA sequence can also be divided into P base k-mer subsequences with overlapping, and each base k-mer subsequence is vectorized through the first neural network to obtain P base k-mer vectors, and the first RNA vector is obtained from the P base k-mer vectors. It is also possible not to convert the RNA sequence into base k-mer subsequences, that is, to directly vectorize each base contained in the RNA sequence through the first neural network to obtain more than one base vector, and the first RNA vector is obtained from the more than one base vector, which is not specifically limited in the present disclosure.

In some embodiments, after the RNA sequence is converted into N base k-mer subsequences, each base k-mer subsequence in the RNA sequence can be encoded to obtain first vectors of N base k-mer subsequences. A first mapping matrix can be used to perform operations on the first vector of N base k-mer subsequences (for example, to perform product operation) to obtain a second vector of N base k-mer subsequences. And, according to the second vector of the N base k-mer subsequences, the first RNA vector can be obtained.

For example, each base k-mer subsequence can be performed on One-Hot encoding. Among them, One-Hot encoding is also referred as one-bit effective encoding. The method is to use N-bit status registers to encode N states. Each state has an independent register bit, and at any time, only one bit in the register is efficient. For example, when k=3, there may be 64 types of base 3-mer subsequences, and each base 3-mer subsequence can be performed One-Hot encoding to obtain the first vector of the base k-mer subsequences.

For example, for the i-th base 3-mer subsequence, that is the base 3-mer subsequence with an index of an integer i, a 64-dimensional One-Hot vector of can be obtained through encoding, the i-th element in the vector is set to 1, and other elements are all set to 0, such as [0, 1, 0, 0, . . . , 0]. Similarly, each base 3-mer subsequence can correspond to a base 3-mer One-Hot vector. For another example, when k=1, each base is a base 1-mer subsequence, that is, each base in the RNA sequence can be encoded to obtain a representation vector corresponding to each base. For example, if the RNA sequence contains L bases, for the j-th base, that is the base with an index of an integer j, an L-dimensional One-Hot vector can be obtained through encoding, the j-th element in the vector is set to 1, and other elements are all set to 0, so that the One-Hot vector of the j-th base can be obtained. In other examples, each base in the RNA sequence can also be encoded into a 4-dimensional One-Hot vector according to the base type. For example, base A can be represented by a One-Hot vector [1, 0, 0, 0], U is represented as [0, 0, 0, 1], G is represented as [0, 1, 0, 0], and C is represented as [0, 0, 1, 0]. Correspondingly, the One-Hot vector of each base in the RNA sequence can also be obtained.

In the example, by performing One-Hot encoding on the base k-mer subsequence, each base k-mer subsequence can be converted into a binary feature, thus making up for the shortcomings of the classification model when processing attribute data, so that the interaction between RNA sequences and protein sequences can be more accurately predicted using the classification model.

After the first vectors of the base k-mer subsequences is obtained, a dense vector can be further used to represent each base k-mer subsequence, that is, the first vector of each base k-mer subsequence is encoded by Embedding to obtain corresponding more than one base k-mer Embedding vector. And, the first RNA vector is obtained according to the more than one base k-mer Embedding vector. In other examples, the Word2vec algorithm can also be used to map each base k-mer subsequence into a vector space, and each base k-mer subsequence can be represented by a vector in the vector space. The Doc2vec algorithm, Glove algorithm, etc. can also be used to convert the base k-mer subsequence into an Embedding vector, and the BERT pre-training model can also be used to encode each base k-mer subsequence to obtain the corresponding base k-mer Embedding vector, which is not specifically limited in the present disclosure.

In exemplary embodiments of the present disclosure, by performing Embedding encoding on the base k-mer subsequence, the discrete base k-mer subsequence can be converted into a low-dimensional continuous vector, which can be used to better represent each base k-mer subsequence. Moreover, the Embedding encoding process is learnable, and in the continuous training process, similar base k-mer subsequences can be made closer in the vector space, realizing category differentiation at the same time of encoding of base k-mer subsequences, so that the interaction between RNA sequences and protein sequences can be more accurately predicted subsequently. In addition, the prediction efficiency of the interaction is also improved to a certain extent.

For example, the first vector may be a One-Hot vector, and the second vector may be an Embedding vector. For the RNA sequence AUCUGAAAU, it can include three base 3-mer subsequences of AUC, UGA and AAU, and each base 3-mer subsequence can be One-Hot encoded to obtain base 3-mer One-Hot vectors, respectively $V_1^R$, $V_2^R$ and $V_3^R$. Since the base 3-mer One-Hot vector is a 64-dimensional sparse vector, the base 3-mer One-Hot vector can be mapped to a dense Embedding vector through a first mapping matrix $W_1$, that is, according to:

$$E_i^R = W_1 \times V_i^R, \qquad (1)$$

the i-th base 3-mer Embedding vector $E_i^R$ in the RNA sequence can be obtained. Where, $V_i^R$ represents the i-th base 3-mer One-Hot vector in the RNA sequence, and the first mapping matrix $W_1$ is a parameter matrix of A*64. For example, A can be 128 or 256, and the value of A in the present disclosure is not specifically limited. Based on this, three 3-mer Embedding vectors corresponding to the base 3-mer subsequences can be obtained, respectively $E_1^R$, $E_2^R$ and $E_3^R$, and then the first RNA vector of can be obtained from the three bases 3-mer Embedding vector, that is, according to:

$$v^R = \frac{1}{N}\sum_{i=1}^{i=N} E_i^R, \qquad (2)$$

the first RNA vector can be calculated, which can be denoted as $v^R$. Among them, $E_i^R$ is the i-th base 3-mer Embedding vector, N represents the number of base 3-mers in the RNA sequence, N=3 in this example. When $v^R$ obtained by the mean value operation is used to represent the complete RNA sequence, the calculation of the interaction can be performed without considering whether the sequence lengths of the RNA sequence and the protein sequence are consistent or not. It can be understood that the summation result of $\sum_{i=1}^{i=N} E_i^R$ can also be taken as the first RNA vector, which is not limited in the present disclosure.

In some embodiments, after the RNA sequence is converted into N base k-mer subsequences, each base k-mer subsequence in the RNA sequence can be encoded to obtain the first vectors of N base k-mer subsequences. Then, the first vectors of N base k-mer subsequences can be input into a recurrent neural network, and N base k-mer vectors can be output, and the first RNA vector can be obtained according to the N base k-mer vectors.

For example, the first vector may be a One-Hot vector. It can be understood that there is a relationship between the various bases in the RNA sequence. In this example, all the base k-mer One-Hot vectors in the RNA sequence can be regarded as a time series sequence, and then the recurrent neural network can be used to perform operation on each base k-mer One-Hot vector. For example, after obtaining all the base 3-mer One-Hot vectors ($V_1^R$, $V_2^R$ and $V_3^R$) in the RNA sequence AUCUGAAAU, the three base 3-mer One-Hot vectors can be input into the LSTM network, and each corresponding base 3-mer vector, respectively $h_1^R$, $h_2^R$ and $h_3^R$, can be output. Among them, the LSTM network is a time recurrent neural network, which is suitable for processing and predicting important events with relatively long intervals and delays in time series. Then, the first RNA vector can be obtained according to the three base 3-mer vectors, that is, according to:

$$v^R = \frac{1}{N}\sum_{i=1}^{i=N} h_i^R, \qquad (3)$$

the first RNA vector $v^R$ can be calculated. Among them, $h_i^R$ is the i-th base 3-mer vector, N represents the number of base 3-mer in the RNA sequence, and N=3 in this example. It can be understood that the summation result of $\Sigma_{i=1}^{i=N} h_i^R$ can also be taken as the first RNA vector, and the first output or the last output of the LSTM network can be taken as the first RNA vector, for example, $h_1^R$ or $h_3^R$ can be taken as the first RNA vector, which is not limited in the present disclosure.

In the embodiments, when more than one base 3-mer One-Hot vector in the RNA sequence is processed using the LSTM network, the dependency between each base 3-mer One-Hot vectors can be learned and memorized to obtain a final RNA vector sequence. The first RNA vector generated according to the RNA vector sequence can accurately reflect the association relationship between more than one base 3-mer in the RNA sequence, and similarity of the RNA-RNA pair and interaction of RNA-protein pair can be more accurately determined using the first RNA vector, to facilitate the generation of higher-quality negative samples.

Figure 3:
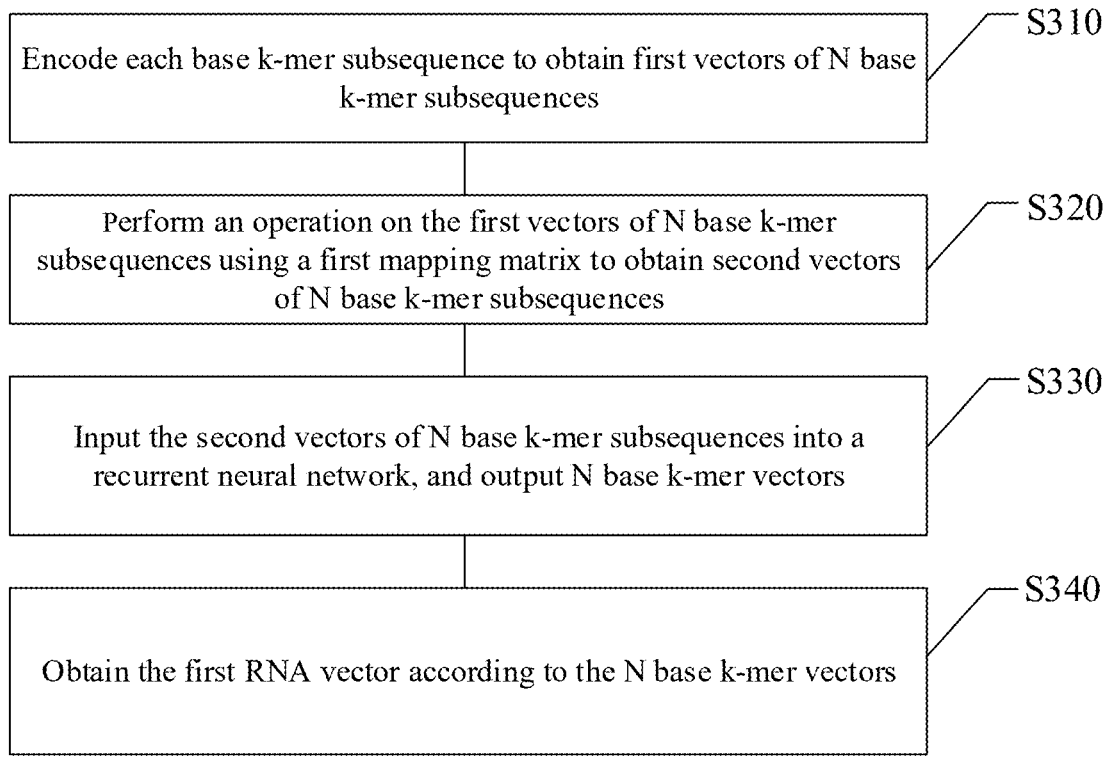
FIG. 3 schematically shows a flow chart of generating a first RNA vector according to some embodiments of the present disclosure.

In some embodiments, after the RNA sequence is converted into N base k-mer subsequences, as shown in FIG. 3, encoding can be performed on each of the base k-mer subsequences in the RNA sequence according to steps S310 to S340, and the first RNA vector is obtained according to the encoding result.

In step S310, each base k-mer subsequence is encoded to obtain first vectors of N base k-mer subsequences.

The first vector may be a One-Hot vector. For example, for the RNA sequence AUCUGAAAU, three base 3-mer subsequences of AUC, UGA and AAU can be included, and each base 3-mer sub-sequence can be One-Hot encoded to obtain three base 3-mer One-Hot vectors, respectively $V_1^R$, $V_2^R$ and $V_3^R$.

In step S320, an operation is performed on the first vectors of the N base k-mer subsequences using a first mapping matrix to obtain second vectors of the N base k-mer subsequences.

The second vector may be an Embedding vector. Since the base 3-mer One-Hot vector is a 64-dimensional sparse vector, the base 3-mer One-Hot vector can be mapped to a dense Embedding vector through the first mapping matrix $W_1$ to obtain three base 3-mer Embedding vectors, respectively $E_1^R$, $E_2^R$, and $E_3^R$.

In step S330, the second vectors of the N base k-mer subsequences are input into a recurrent neural network, and N base k-mer vectors are output.

It can be understood that there is a relationship between the various bases in the RNA sequence. In this example, all the base 3-mer Embedding vectors in the RNA sequence can be regarded as a time series sequence, and then the recurrent neural network can be used to perform operations on each base 3-mer Embedding vector. For example, after obtaining all base 3-mer Embedding vectors ($E_1^R$, $E_2^R$, and $E_3^R$) in the RNA sequence AUCUGAAAU, the three base 3-mer Embedding vectors can be input into the LSTM network and the corresponding three base 3-mer vectors, respectively $h_1^R$, $h_2^R$, and $h_3^R$, can be output.

Specifically, the Embedding vector $E_1^R$ corresponding to "AUC" can be input into the LSTM network first, and hidden feature extraction can be performed on $E_1^R$ through the LSTM network, and the hidden vector $h_1^R$ at that moment, such as at moment t, can be output. Then, the hidden vector $h_1^R$ at moment t can be spliced with the Embedding vector $E_2^R$ corresponding to "UGA" at moment t+1, and the spliced vector can be input into the LSTM network and be performed hidden feature extraction, and the hidden vector $h_2^R$ at moment t+1 can be output. Similarly, the Embedding vector at the current moment can be sequentially spliced with the hidden vector passed down at the previous moment, and feature extraction is performed on the spliced vector through the LSTM network. Finally, the Embedding vector $E_3^R$ corresponding to "AAU" can be input into the LSTM network, the hidden vector $h_2^R$ at moment t+1 is spliced with the Embedding vector $E_3^R$, the hidden feature extraction is performed on the spliced vector through the LSTM network, and the hidden vector $h_3^R$ at the final moment is output. In other examples, the GRU network can also be used to perform operation on each base 3-mer Embedding vector. The structure of the GRU network is relatively simple, and the implementation effect is the same as that of the LSTM network. It is also possible to directly input each base 3-mer One-Hot vector in the RNA sequence into the GRU network to obtain the corresponding base 3-mer vector, which is not specifically limited in the present disclosure.

In step S340, the first RNA vector is obtained according to the N base k-mer vectors.

After obtaining N base k-mer vectors ($h_i^R$, i=1, 2, . . . , N), the first RNA vector $v^R$ can be calculated according to formula (3), or the summation result of $\Sigma_{i=1}^{i=N} h_i^R$ in formula (3) can be taken as the first RNA vector, or the first out or the last output of the LSTM network can also be taken as the first RNA vector, for example, $h_1^R$ or $h_3^R$ may be taken as first RNA vector, which is not limited in the present disclosure.

In the embodiments, when more than one base 3-mer One-Hot vector in the RNA sequence is processed using the LSTM network, the dependencies between each of the base 3-mer One-Hot vectors can be learned and memorized to obtain a final RNA vector sequence. The first RNA vector generated according to the RNA vector sequence can accurately reflect the association relationship between more than one base 3-mer in the RNA sequence, and similarity of the RNA-RNA pair and interaction of RNA-protein pair can be more accurately determined using the first RNA vector, to facilitate the generation of higher-quality negative samples.

In step S230, the more than one protein sequences are vectorized to obtain more than one first protein vector.

Similarly, description may be made by taking the first part of the model in the vector model as a neural network as an example. For example, the protein sequence in each RNA-protein pair can be vectorized by a second neural network to obtain the first protein vector corresponding to each protein sequence, so as to determine the interaction of the more than one RNA-protein pair according to the first protein vector and the first RNA vector, and then the entire vector model can be trained according to the interaction of the RNA-protein pair combined with the similarity of the RNA-RNA pair and the similarity of the protein-protein pair, and the trained vector model can be used to generate a negative example RNA-protein pair corresponding to each positive example RNA-protein pair. The second neural network in the exemplary embodiments of the present disclosure may be an Embedding network, may also be a recurrent neural network, or may be a network structure composed of the Embedding network and the recurrent neural network. Among them, the recurrent neural network may be an LSTM network, or may be a bidirectional recurrent neural network, a GRU network, etc., which is not specifically limited in the present disclosure. It should be noted that the first neural network may be the same as the second neural network, for example, both of which may be a network structure composed of an Embedding network and a recurrent neural network. The first neural network can also be different from the second neural network. For example, the first neural network can be a network structure composed of an Embedding network and a recurrent neural network, and the second neural network can be a recurrent neural network, which is not limited in the present disclosure.

In the embodiments of the present disclosure, a protein sequence may be represented by an amino acid sequence. It can include 20 kinds of amino acids, and the 20 kinds of amino acids are sequentially encoded as A, G, V, I, L, F, P, Y, M, T, S, H, N, Q, W, R, K, D, E, and C. For example, a protein sequence can be represented as MTAQDDSYS . . . . Correspondingly, amino acid k-mer subsequences can also be used to represent protein sequences. Specifically, all amino acid k-mer subsequences can be obtained by arranging and combining 20 amino acids, and 20 k kinds of amino acid k-mer subsequences can be obtained for a certain k value. For example, when k is 3, there are 20 3=8000 kinds of amino acid 3-mer subsequences in total. For example, MTA, QDD and SYS are three kinds of different amino acid 3-mer subsequences. Therefore, the protein sequence M TAQDDSYS . . . can also be expressed as {MTA, QDD, SYS, . . . }. In other examples, the protein sequence can also be read in an overlapping manner to obtain the corresponding amino acid 3-mer subsequences. Correspondingly, the amino acid 3-mer subsequences of the protein sequence may also include MTA, TAQ, AQD, etc. According to the physical and chemical properties of amino acids, the 20 kinds of amino acids can be divided into {A, G, V}, {I, L, F, P}, {Y, M, T, S}, {H, N, Q, W}, {R, K}, {D, E}, and {C}, 7 kinds in total, and each kind of amino acid is recoded, such as being recoded as 1, 2, 3, 4, 5, 6, and 7 in sequence. For example, the protein sequence MTAQDDSYS . . . can be converted to 331466333 . . . . Then all the amino acid k-mer subsequences can be obtained by arranging and combining the 7 kinds of amino acids, and 7 k kinds of amino acid k-mer subsequences can be obtained for a certain k value. It can be understood that the classification of the 20 kinds of amino acids into 7 kinds is only illustrative, and the 20 kinds of amino acids can also be classified according to the composition of the amino acids. Similarly, the four kinds of bases in the RNA sequence can also be classified according to actual needs.

When each protein sequence is encoded through the second neural network, partial amino acids of the protein sequence can be encoded, so as to obtain the first protein vector according to the encoding result of the partial amino acids. It is also possible to encode all the amino acids of the protein sequence, so as to obtain the first protein vector according to the encoding results of all the amino acids. It is also possible to encode all the amino acids of the protein sequence, and select the encoding results of partial amino acids to obtain the first protein vector according to the encoding results of the partial amino acids, which is not specifically limited in the present disclosure.

In exemplary embodiments of the present disclosure, it is described by taking encoding all amino acids of each protein sequence and obtaining the first protein vector according to all encoded amino acids as an example. Each protein sequence can be converted to M amino acid k-mer subsequences. Taking any protein sequence as an example, according to the value of k, consecutive k amino acids can be sequentially taken from the first amino acid of the protein sequence to form an amino acid k-mer subsequence of the protein sequence; until the last k amino acids in the protein sequence are taken, all amino acid k-mer subsequences of the protein sequence are obtained. Then, each amino acid k-mer subsequence can be vectorized through the second neural network to obtain M amino acid k-mer vectors, and the first protein vector can be obtained according to the M amino acid k-mer vectors. For example, the protein sequence can be divided into M amino acid k-mer subsequences without overlapping. For example, if the protein sequence is MTAQDDSYS, it can be divided into three amino acid k-mer subsequences, namely MTA, QDD and SYS. In other examples, the protein sequence can also be divided into Q amino acid k-mer subsequences with overlapping, and each amino acid k-mer subsequence is vectorized through the second neural network to obtain Q amino acid k-mer vectors, and the first protein vector is obtained from the Q amino acid k-mer vectors. It is also possible not to convert the protein sequence into amino acid k-mer subsequences, that is, to directly vectorize each amino acid contained in the protein sequence through the second neural network to obtain more than one amino acid vector, and obtain the first protein vector from more than one amino acid vector, which is not specifically limited in the present disclosure.

In some embodiments, after converting the protein sequence into M amino acid k-mer subsequences, each amino acid k-mer subsequence in the protein sequence can be encoded to obtain firsts vector of M amino acid k-mer subsequences. A second mapping matrix can be used to perform operation on the first vectors of M amino acid k-mer subsequences (for example, to perform a product operation) to obtain the second vectors of M amino acid k-mer subsequences. And, according to the second vectors of the M amino acid k-mer subsequences, the first protein vector can be obtained.

For example, each amino acid k-mer subsequence can performed One-Hot encoding. For example, when k=3, there can be 8000 kinds of amino acid 3-mer subsequences, and each amino acid 3-mer subsequence can be performed One-Hot encoding to obtain the first vectors of amino acid k-mer subsequences.

For example, for the j-th amino acid 3-mer subsequence, that is, the amino acid 3-mer subsequence with an index of an integer j, an 8000-dimensional One-Hot vector can be obtained through encoding, and the j-th element in the vector is set to 1, other elements are all set to 0, such as [1, 0, 0, . . . , 0]. Similarly, each amino acid 3-mer subsequence can correspond to an amino acid 3-mer One-Hot vector. For another example, when k=1, each amino acid is an amino acid 1-mer subsequence, that is, each amino acid in the protein sequence can be encoded to obtain a representation vector corresponding to each amino acid. For example, if the protein sequence contains S amino acids, for the j-th amino acid, that is, the amino acid with an index of an integer j, an S-dimensional One-Hot vector can be obtained through encoding, and the j-th element in the vector is set to is 1, and all other elements are set to 0, the One-Hot vector of the j-th amino acid can be obtained. In other examples, each amino acid in the protein sequence can also be encoded into a 20-dimensional One-Hot vector according to the kind of amino acid, so as to obtain the One-Hot vector of each amino acid in the protein sequence. It is also possible to classify 20 kinds of amino acids, and encode each amino acid in the protein sequence into a One-Hot vector the vector dimension of which is consistent with the number of classification categories. For example, when 20 kinds of amino acids are divided into 7 categories, each amino acid in the protein sequence can be encoded as a 7-dimensional One-Hot vector, which is not limited in the present disclosure.

In this example, by performing One-Hot encoding on the amino acid k-mer subsequence, each amino acid k-mer subsequence can be converted into a binary feature, thus making up for the shortcomings of the classification model when processing attribute data, so that the interaction between RNA sequences and protein sequences can be more accurately predicted using the classification model.

After the first vectors of the amino acid k-mer subsequence are obtained, a dense vector can be further used to represent each amino acid k-mer sub-sequence, that is, the first vector of each amino acid k-mer sub-sequence is encoded by Embedding in turn to obtain corresponding more than one amino acid k-mer Embedding vector. And, the first protein vector is obtained according to the more than one amino acid k-mer Embedding vector. In other examples, the Word2vec algorithm can also be used to map each amino acid k-mer subsequence into a vector space, and each amino acid k-mer subsequence can be represented by a vector in the vector space. It is also possible to use the Doc2vec algorithm, the Glove algorithm, etc. to convert the amino acid k-mer subsequence into an Embedding vector, and the BERT pre-training model can also be used to encode each amino acid k-mer subsequence to obtain the corresponding amino acid k-mer Embedding vector, which is not specifically limited in the present disclosure.

In the exemplary embodiments of the present disclosure, by performing Embedding encoding on the amino acid k-mer subsequence, the discrete amino acid k-mer subsequence can be converted into a low-dimensional continuous vector, which can be used to better represent each Amino acid k-mer subsequence. Moreover, the Embedding coding process is learnable, and in the continuous training process, similar amino acid k-mer subsequences can be made closer in the vector space, realizing category differentiation at the same time of encoding amino acid k-mer subsequences, so that the interaction between RNA sequences and protein sequences can be predicted more accurately subsequently. In addition, the prediction efficiency of the interaction is also improved to a certain extent.

For example, the first vector may be a One-Hot vector, and the second vector may be an Embedding vector. For the protein sequence MTAQDDSYS, it can include three amino acid 3-mer subsequences of MTA, QDD and SYS, and each amino acid 3-mer subsequence can be One-Hot encoded to obtain amino acid 3-mer One-Hot vectors, respectively $V_1^P$, $V_2^P$ and $V_3^P$. Since the amino acid 3-mer One-Hot vector is an 8000-dimensional sparse vector, the amino acid 3-mer One-Hot vector can be mapped to a dense Embedding vector through the second mapping matrix $W_2$, that is, according to:

$$E_j^P = W_2 \times V_j^P, \qquad (4)$$

the j-th amino acid 3-mer Embedding vector $E_j^P$ in the protein sequence can be obtained. Where, $V_j^P$ represents the j-th amino acid 3-mer One-Hot vector in the protein sequence, and the second mapping matrix $W_2$ is a parameter matrix of B*8000. For example, B can be 256 or 128, and the value of B in this disclosure is not specifically. Based on this, three amino acid 3-mer Embedding vectors corresponding to the amino acid 3-mer subsequences can be obtained, respectively $E_1^P$, $E_2^P$ and $E_3^P$, and then the first protein vector can be obtained from the three amino acid 3-mer Embedding vector, that is, according to:

$$v^P = \frac{1}{M} \sum_{j=1}^{j=M} E_j^P, \qquad (5)$$

the first protein vector can be calculated, which can be denoted as $v^P$. Among them, $E_j^P$ is the j-th amino acid 3-mer Embedding vector, M represents the number of amino acid 3-mers in the protein sequence, M=3 in this example. When $v^P$ obtained by the mean value operation is used to represent the complete protein sequence, the calculation of the interaction can be performed without considering whether the sequence lengths of the RNA sequence and the protein sequence are consistent or not. It can be understood that the summation result of $\Sigma_{j=1}^{j=M} E_j^P$ can also be taken as the first protein vector, which is not limited in the present disclosure.

In some embodiments, after the protein sequence is converted into M amino acid k-mer subsequences, each amino acid k-mer subsequence in the protein sequence can be encoded to obtain first vectors of M amino acid k-mer subsequences. Then, the first vectors of M amino acid k-mer subsequences can be input into a recurrent neural network, and the M amino acid k-mer vectors can be output, and the first protein vector can be obtained according to the M amino acid k-mer vectors.

For example, the first vector may be a One-Hot vector. It can be understood that there is a relationship between the various amino acids in the protein sequence. In this example, all the amino acid 3-mer One-Hot vectors in the protein sequence can be regarded as a time series sequence, and then the recurrent neural network can be used to perform operation on each amino acid 3-mer One-Hot vector. For example, after obtaining all the amino acid 3-mer One-Hot vectors ($V_1^P$, $V_2^P$, and $V_3^P$) in the protein sequence MTAQDDSYS, the three amino acid 3-mer One-Hot vectors can be input into the LSTM network, and the corresponding amino acid 3-mer vectors, respectively $h_1^P$, $h_2^P$, and $h_3^P$, can be output. Then, the first protein vector can be obtained according to the three amino acid 3-mer vectors, that is, according to:

$$v^P = \frac{1}{M} \sum_{j=1}^{j=M} h_j^P, \qquad (6)$$

the first protein vector $v^P$ can be calculated. Among them, $h_j^P$ is the j-th amino acid 3-mer vector, M represents the number of amino acid 3-mers in the protein sequence, and M=3 in this example. It can be understood that the summation result of $\Sigma_{j=1}^{j=M} h_j^P$ can also be taken as the first protein vector, and the first output or the last output of the LSTM network can also be taken as the first protein vector, for example, $h_1^P$ or $h_3^P$ can be taken as the first protein vector, which is not limited in the present disclosure.

In the embodiment, when more than one amino acid 3-mer One-Hot vector in the protein sequence is processed using the LSTM network, the dependency relationship between each amino acid 3-mer One-Hot vector can be learned and memorized to obtain a final protein vector sequence. The first protein vector generated according to the protein vector sequence can accurately reflect the association relationship between more than one amino acid 3-mer in the protein sequence, and similarity of the RNA-RNA pair and interaction of RNA-protein pair can be more accurately determined using the first protein vector, to facilitate the generation of higher-quality negative samples.

Figure 4:
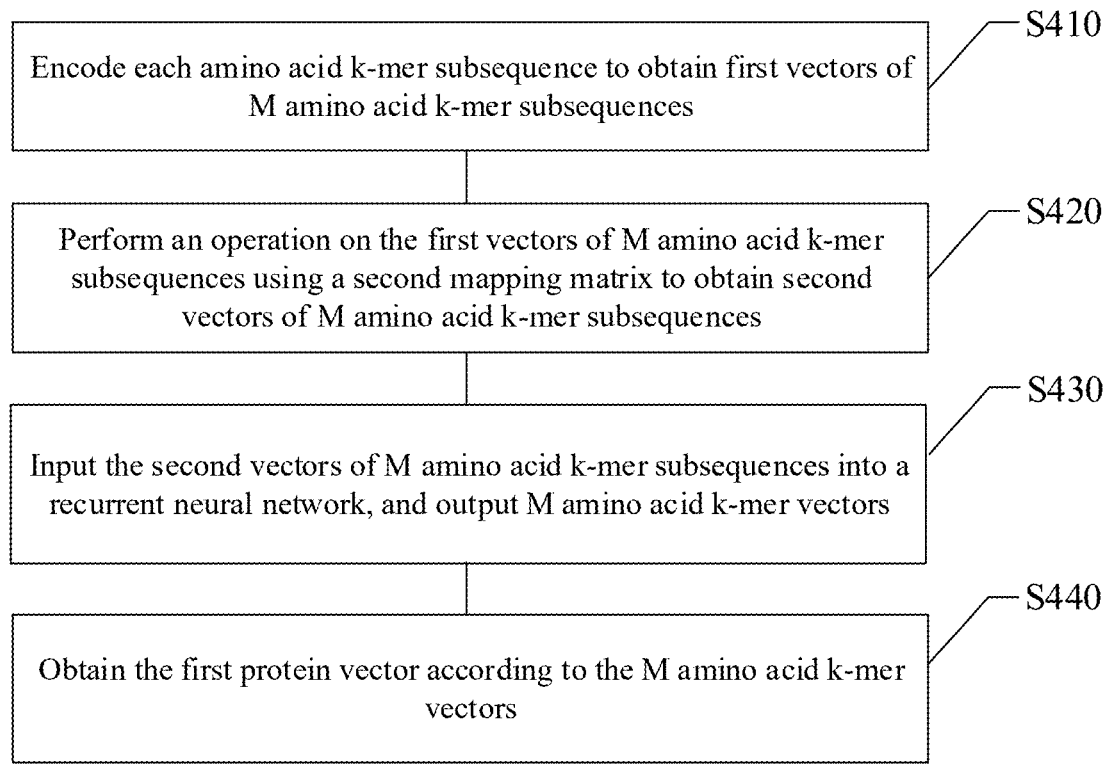
FIG. 4 schematically shows a flow chart of generating a first protein vector according to some embodiments of the present disclosure.

In some embodiments, after the protein sequence is converted into M amino acid k-mer subsequences, as shown in FIG. 4, each amino acid k-mer subsequence in the protein sequence can be encoded according to steps S410 to S440, and the first protein vector is obtained according to the encoding result.

In step S410, each amino acid k-mer subsequence is encoded to obtain first vectors of M amino acid k-mer subsequences.

The first vector may be a One-Hot vector. For example, for the protein sequence MTAQDDSYS, three amino acid 3-mer subsequences of MTA, QDD and SYS can be included, and each amino acid 3-mer sub-sequence can be One-Hot encoded to obtain three amino acid 3-mer One-Hot vectors, respectively $V_1^P$, $V_2^P$ and $V_3^P$.

In step S420, an operation is performed on the first vectors of the M amino acid k-mer subsequences using a second mapping matrix to obtain seconds vector of the M amino acid k-mer subsequences.

The second vector may be an Embedding vector. Since the amino acid 3-mer One-Hot vector is an 8000-dimensional sparse vector, the amino acid 3-mer One-Hot vector can be mapped to a dense Embedding vector through the second mapping matrix $W_2$ to obtain three amino acid 3-mer Embedding vectors, respectively $E_1^P$, $E_2^P$, and $E_3^P$.

In step S430, the second vectors of the M amino acid k-mer subsequences are input into a recurrent neural network, and M amino acid k-mer vectors are output.

It can be understood that there is a relationship between the various amino acids in the protein sequence. In this example, all the amino acid 3-mer Embedding vectors in the protein sequence can be regarded as a time series sequence, and then the recurrent neural network can be used to perform operations on each amino acid 3-mer Embedding vector. For example, after obtaining all the amino acid 3-mer Embedding vectors ($E_1^P$, $E_2^P$, and $E_3^P$) in the protein sequence M TAQDDSYS, the three amino acid 3-mer Embedding vectors can be input into the LSTM network, and the corresponding three amino acid 3-mer vectors, respectively $h_1^P$, $h_2^P$ and $h_3^P$, can be output.

Specifically, the Embedding vector $E_1^P$ corresponding to "MTA" can be input into the LSTM network first, and hidden feature extraction can be performed on $E_1^P$ through the LSTM network, the hidden vector $h_1^P$ at that moment, such as at moment t, can be output. Then, the hidden vector $h_1^P$ at moment t can be spliced with the Embedding vector $E_2^P$ corresponding to "QDD" at moment t+1, and the spliced vector can be input into the LSTM network and can be performed hidden feature extraction, and the hidden vector $h_2^P$ at moment t+1 can be output. Finally, the Embedding vector $E_3^P$ corresponding to "SYS" can be input into the LSTM network, the hidden vector $h_2^P$ at moment t+1 is spliced with the Embedding vector $E_3^P$, the hidden feature extraction is performed on the spliced vector through the LSTM network, and the hidden vector $h_3^P$ at the final moment is output. In other examples, the GRU network can also be used to perform operation on each amino acid 3-mer Embedding vector. It is also possible to directly input each amino acid 3-mer One-Hot vector in the protein sequence into the GRU network to obtain the corresponding amino acid 3-mer vector, which is not specifically limited in the present disclosure.

In step S440, the first protein vector is obtained according to the M amino acid k-mer vectors.

After obtaining M amino acid k-mer vectors ($h_j^P$, j=1, 2, . . . , M), the first protein vector $v^P$ can be calculated according to formula (6), or the summation result of $\Sigma_{j=1}^{j=M}$ $h_j^P$ in formula (6) can be taken as the first protein vector, or the first out or the last output of the LSTM network can also be used as the first protein vector, for example, $h_1^P$ or $h_3^P$ may be taken as the first protein vector, which is not specifically limited in the present disclosure.

In the embodiments, when more than one amino acid 3-mer One-Hot vector in a protein sequence is processed using the LSTM network, the dependency between each amino acid 3-mer One-Hot vector can be learned and memorized to obtain a final protein vector sequence. The first protein vector generated according to the protein vector sequence can accurately reflect the association relationship between more than one amino acid 3-mer in the protein sequence, and similarity of the protein-protein pair and interaction of RNA-protein pair can be more accurately determined using the first protein vector, to facilitate the generation of higher-quality negative samples. In addition, it can be understood that, in order to facilitate the calculation of the interaction between RNA and protein, the dimensions of the base 3-mer vector $h_i^R$ and the amino acid 3-mer vector $h_j^P$ output by the LSTM network can be consistent with each other, such as, both of which may be 64 dimensions, or may be 128 dimensions, which is not specifically limited in the present disclosure.

After obtaining the first RNA vector and the first protein vector through the vector model, the whole vector model can be performed on supervised learning using three kinds of information of similarity of RNA-RNA, similarity of protein-protein and interaction of RNA-protein, so that the RNA vector and the protein vector output by the model can accurately reflect the interaction between RNA and protein, the similarity between RNA and RNA, and the similarity between protein and protein. When the vector model obtained based on multi-task learning training is used to generate negative samples later, it can ensure that the negative samples are similar to the known positive samples, improving the quality of the negative samples.

In step S240, the interaction between the RNA sequence and the protein sequence is determined according to the first RNA vector and the first protein vector.

In the embodiments of the present disclosure, after the first RNA vector and the first protein vector are obtained, the second part of the model in the vector model can be used to determine the interaction between the RNA sequence and the protein sequence. When calculating the interaction between the RNA sequence and the protein sequence, the calculation result may be that there is an interaction between the RNA sequence and the protein sequence, or that there is no interaction between the RNA sequence and the protein sequence, that is, to perform a prediction of two classification. For example, the first RNA vector and the first protein vector can be input into a logistic regression model to classify the interaction between the RNA sequence and the protein sequence according to the first RNA vector and the first protein vector. For example, the Sigmoid activation function can be used to output the classification probability, and the softmax activation function can also be used to output the classification probability, that is, the probability of presence of the interaction between the output RNA sequence and the protein sequence and/or the probability of absence of the interaction between the RNA sequence and the protein sequence are output.

In some embodiments, according to following formulas:

$$p(1|(v^R, v^P)) = \frac{1}{1 + e^{(\theta \cdot (v^R, v^P))}}, \qquad (7)$$

-continued $$p(0|(v^R, v^P)) = 1 - \frac{1}{1 + e^{(\theta \cdot \langle v^R, v^P \rangle)}}, \quad (8)$$

the probability value $p(1|(v^R, v^P))$ of presence of the interaction between RNA sequence and the protein sequence, and the probability value $p(0|(v^R, v^P))$ of absence of the interaction between the RNA sequence and the protein sequence are calculated respectively; where, $\theta$ is the model parameter, $v^R$ is the first RNA vector, and $v^P$ is the first protein vector, $\langle v^R, v^P \rangle$ represents a dot product operation of $v^R$ and $v^P$, and the calculated result of $\theta \cdot \langle v^R, v^P \rangle$ represents the relationship score between the RNA sequence and the protein sequence. In other examples, models such as SVM and decision tree can also be used to obtain the probability value of presence of the interaction between the RNA sequence and the protein sequence, which is not limited in the present disclosure.

In step S250, a distance between any two RNA sequences is calculated to obtain a similarity of more than one RNA-RNA pair.

In exemplary embodiments of the present disclosure, when obtaining the information of the similarity of RNA-RNA, the similarity of more than one RNA-RNA pair can be obtained by calculating a sequence distance between any two RNA sequences in the data set obtained in step S210. It can be determined that whether two RNA sequences are similar or not according to the similarity. For example, an edit distance between any two RNA sequences can be calculated, and the sequence distance between any two RNA sequences can be obtained according to the edit distance. Finally, the similarity of more than one RNA-RNA pair can be obtained according to the sequence distance of any two RNA sequences.

Specifically, for two RNA sequences $r_i$ and $r_j$, it is possible that, according to:

$$d(r_i, r_j) = \frac{lev(r_i, r_j)}{\max(len(r_i), len(r_j))}, \quad (9)$$

the sequence distance $d(r_i, r_j)$ between $r_i$ and $r_j$ is calculated; among them, $lev(r_i, r_j)$ represents the edit distance of $r_i$ and $r_j$, and $\max(len(r_i), len(r_j))$ represents taking the maximum value of $len(r_i)$ and $len(r_j)$, the ratio of $lev(r_i, r_j)$ and $\max(len(r_i), len(r_j))$ is the normalized edit distance, which can more intuitively represent the sequence distance between $r_i$ and $r_j$. $len(r_i)$ represents the length of $r_i$, $r_i$ can contain a number of bases, and $len(r_j)$ represents the length of $r_j$, $r_j$ can contain b number of bases.

It is possible that, according to:

$$lev_{r_i,r_j}(a, b) = \begin{cases} \max(a, b) & \text{if } \min(a, b) = 0 \\ \min \begin{cases} lev_{r_i,r_j}(a-1, b)+1 \\ lev_{r_i,r_j}(a, b-1)+1 \\ lev_{r_i,r_j}(a-1, b-1)+2_{r_{i_a} \neq r_{j_b}} \end{cases} & \text{otherwise} \end{cases}, \quad (10)$$

the edit distance between a number of bases in $r_i$ and b number of bases in $r_j$, that is, the sequence distance $lev(r_i, r_j)$ between $r_i$ and $r_j$. In formula (10), $\min(lev_{r_i,r_j}(a-1, b)+1)$ represents the minimum number of operations required to change $r_i$ to $r_j$ by deleting the bases in $r_i$. $\min(lev_{r_i,r_j}(a, b-1)+1)$ represents the minimum number of operations required to change $r_i$ to $r_j$ by inserting bases into $r_i$. min $$\left( lev_{r_i,r_j}(a-1, b-1) + 2_{r_{i_a} \neq r_{j_b}} \right)$$

represents the minimum number of operations required to change $r_i$ to $r_j$ by substituting bases in $r_i$, where, $$2_{r_{i_a} \neq r_{j_b}}$$

is an indicator function, when $$r_{i_a} = r_{j_b}, 2_{r_{i_a} \neq r_{j_b}} = 0,$$

and otherwise $$2_{r_{i_a} \neq r_{j_b}} = 2.$$

It can be understood that taking the smallest calculation result among the three is the minimum edit distance. When $\min(a, b)=0$, that is, when there is an RNA sequence with a length of 0 in the $r_i$ and $r_j$, by performing $\max(a, b)$, the base number of another RNA sequence whose length is not 0 can be taken as the edit distance between the two RNA sequences $r_i$ and $r_j$.

It should be noted that the larger the editing distance between two RNA sequences is, the less similar the two RNA sequences are. Correspondingly, the larger the sequence distance $d(r_i, r_j)$ is, the less similar the two RNA sequences are. Therefore, the similarity between two RNA sequences can be measured by formula (11), that is, according to:

$$simR(r_i, r_j) = 1 - d(r_i, r_j), \quad (11)$$

the similarity $simR(r_i, r_j)$ of more than one RNA-RNA pair is obtained; where, $d(r_i, r_j)$ represents the sequence distance between $r_i$ and $r_j$. It is also possible that, according to:

$$simR(r_i, r_j) = \frac{1}{d(r_i, r_j)}, \quad (12)$$

the similarity $simR(r_i, r_j)$ of more than one RNA-RNA pair is obtained. In other examples, a vector space model (VSM) can also be used to calculate the distance between any two RNA sequences to obtain the similarity of more than one RNA-RNA pair. Among them, the vector space model refers to simplifying the processing of text content into vector operations in the vector space, and expressing the similarity of semantics with the similarity in space. For example, a certain text can be regarded as a series of words, each word corresponds to a weight, and the weights of all words can be composed into a vector. Similarly, after obtaining the vectors corresponding to all texts, a text space can be composed of all the vectors. Then, the similarity between texts can be measured by computing the similarity between the vectors. For example, each RNA sequence can be converted into an RNA vector, and the distance between any two RNA vectors can be calculated to obtain the similarity of more than one RNA-RNA pair. For example, a cosine distance, a Euclidean distance, a Mahalanobis distance, etc. of any two RNA vectors can be calculated, which is not specifically limited in the present disclosure. Where, the closer the distance between two RNA vectors is, the more similar the two RNA vectors are.

In step S260, the distance between any two protein sequences is calculated to obtain the similarity of more than one protein-protein pair.

For protein, the diversity of amino acid side chain R group endows protein with rich and colorful structures and functions, and the physical and chemical properties of protein are also determined by the properties of amino acid side chain R group. Classification of the properties of amino acid side chain R group can facilitate the analysis of the physical and chemical properties of protein, so that it can be more accurately determined whether two protein sequences are similar or not.

In exemplary embodiments of the present disclosure, when obtaining protein-protein similarity information, a vector space model can be used to calculate the distance between any two protein sequences to obtain the similarity of more than one protein-protein pair. Specifically, more than one protein sequence can be mapped into the vector space to obtain more than one protein vector, that is, more than one protein sequence can be converted into vector with a same dimension, so as to represent each protein sequence in the vector space of the same dimension. After obtaining more than one protein vector, the similarity of more than one protein-protein pair can be obtained by calculating the distance between any two protein vectors. Similarly, a cosine distance, a Euclidean distance, a Mahalanobis distance, etc. of any two protein vectors can be calculated, which is not specifically limited in the present disclosure. Among them, the closer the distance between two protein vectors is, the more similar the two protein vectors are.

For example, when converting a protein sequence into a vector, the 20 kinds of amino acids can be divided into non-polar amino acids and polar amino acids according to the polarity (chemical structure) of the side chain R group in the amino acid. Among them, polar amino acids can be divided into polar neutral amino acids, acidic amino acids and basic amino acids. For any two protein sequences $p_i$ and $p_j$, all amino acids in each protein sequence can be divided into four categories: non-polar amino acids, polar neutral amino acids, acidic amino acids and basic amino acids. For the convenience of representation, non-polar amino acids, polar neutral amino acids, acidic amino acids and basic amino acids can be denoted as a, b, c and d, respectively. For example, for the protein sequence MTAQDDSY..., where M is methionine, which is a polar neutral amino acid, and T is threonine, which is also a polar neutral amino acid. By analogy, the protein sequence can be expressed as bbabccbb....

In one example, the protein sequence can also be represented by an amino acid k-mer subsequence, and the specific value of k can also be adjusted according to the actual situation, which is not limited here. Since there are 4 kinds of amino acids classified according to the polarity of the side chain R group in the amino acid, k=4 can be taken as an example in this example for illustration. Correspondingly, there are 4 4=256 amino acid 4-mer subsequences. Therefore, the protein sequence can be represented as a 256-dimensional vector, each dimension corresponds to an amino acid 4-mer subsequence, and the value of each dimension represents the number of occurrences of the corresponding amino acid 4-mer subsequence in the protein sequence, which is the weight of the corresponding amino acid 4-mer subsequence. For example, the protein sequence bbabccbb... can be expressed as a vector [3, 1, ...], where 3 indicates that the amino acid 4-mer subsequence bbab appears 3 times in the protein sequence.

Correspondingly, the similarity of protein-protein can be calculated in a 256-dimensional vector space. For example, vector space cosine similarity can be calculated, that is, according to:

$$simP(p_i, p_j) = \frac{\langle v_i, v_j \rangle}{\sqrt{\langle v_i, v_i \rangle} \sqrt{\langle v_j, v_j \rangle}}, \quad (13)$$

the similarity of $p_i$ and $p_j$ is calculated; where, $v_i$ represents the vector representation of $p_i$ in the vector space, $v_j$ represents the vector representation of $p_j$ in the vector space, $\langle v_i, v_j \rangle$ represents dot product operation between the vector $v_i$ and the vector $v_j$, $\sqrt{\langle v_i, v_i \rangle}$ represents the modulus length of vector $v_i$, $\sqrt{\langle v_j, v_j \rangle}$ represents the modulus length of the vector $v_j$, $simP(p_i, p_j)$ represents the cosine value of the angle between the vector $v_i$ and the vector $v_j$, the closer the cosine value is to 1, the closer the angle is to 0 degrees, that is, the higher the similarity between the vector viand the vector $v_j$ is.

In this example, all amino acids in the protein sequence are classified according to the polarity of the side chain R group in the amino acid, and the protein sequence is represented by the classified amino acid, and the protein sequence is mapped to the vector space to obtain a vector representation of the protein sequence in a vector space. Based on this, it can be more accurately determined whether the physical and chemical properties of the two proteins are similar or not. When the physical and chemical properties of the two proteins are similar, it can be considered that the two protein sequences are similar, that is, the protein vector obtained by vector model learning can more accurately reflect the protein the similarity between protein sequences, so as to generate high-quality negative samples.

In other examples, the similarity of more than one protein-protein pair can also be obtained by calculating the sequence distance between any two protein sequences. For example, the edit distance between any two protein sequences can be calculated, and the sequence distance between any two protein sequences can be obtained according to the edit distance. Finally, the similarity of more than one protein-protein pair can be obtained according to the sequence distance between any two protein sequences, the calculation process is similar to step S250, and will not be repeated here.

In step S270, the vector model is trained according to the interaction between the RNA sequence and the protein sequence, the similarity of the RNA-RNA pair, and the similarity of the protein-protein pair.

In the exemplary embodiments of the present disclosure, in order to generate high-quality negative samples, it is necessary to enable the RNA vector and the protein vector learned by the vector model to accurately reflect the interaction between the RNA sequence and the protein sequence, the similarity between RNA-RNA, and the similarity between protein-protein. Therefore, after using the first part of the model in the vector model to obtain the first RNA vector and the first protein vector, the RNA-RNA similarity and protein-protein similarity can be obtained, and using the second part of the model in the vector model, RNA-protein interaction can be obtained, and using these three kinds of information, the whole vector model can be trained. For example, an objective function can be constructed according to the interaction between RNA sequence and protein sequence, the similarity of RNA-RNA pair and the similarity of protein-protein pair. Based on the objective function, the model parameter of the vector model can be iteratively updated using the stochastic gradient descent algorithm, and the training of the vector model is completed when an iteration termination condition is satisfied. For example, the data set composed of RNA-protein pairs obtained in step S210 can be taken as a training data set, and only one RNA-protein pair in the training data set is randomly selected each time to update the gradient of the objective function, and then to update the model parameter of the vector model towards the opposite direction of the gradient.

It should be noted that the objective function constructed in the present disclosure can contain three items, the first and second items can be used to reflect the similarity between RNA-RNA and protein-protein respectively, and the third item can be used to reflect the interaction relationship between RNA and protein. By calculating the loss value of each item in the objective function and combing the loss value of each item, the degree of inconsistency between the output of the vector model and the label value is estimated, so as to achieve the goal of minimizing the objective function.

For example, for the first item of the objective function, the similarity of the RNA-RNA pair calculated in step S250 can be taken as a label value, and after obtaining more than one first RNA vector through the vector model, the similarity of any two first RNA vectors can be calculated, and the loss value of the first item can be calculated according to the similarity and the corresponding label value, that is, according to:

$$L_1 = \Sigma_{i,j} \left\| \frac{\langle v_i^R, v_j^R \rangle}{|v_i^R||v_j^R|} - simR(r_i, r_j) \right\|^2. \tag{14}$$

Among them, $v_i^R$ represents the i-th first RNA vector, $v_j^R$ represents the j-th first RNA vector, $r_i$ represents the i-th RNA sequence, $r_j$ represents the j-th RNA sequence, $\frac{\langle v_i^R, v_j^R \rangle}{|v_i^R||v_j^R|}$ represents the similarity of two first RNA vectors, and $simR(r_i, r_j)$ represents the similarity of two RNA sequences, that is, the label value. When calculating $L_1$, if the similarity of the two first RNA vectors is closer to the similarity of the corresponding two RNA sequences, the calculated loss value is smaller, indicating that when the two RNA sequences are similar, the generated RNA vectors are also similar, or when the two RNA sequences are dissimilar, the generated RNA vectors are also dissimilar. Conversely, when the similarity of the two first RNA vectors is far from the similarity of the corresponding two RNA sequences, the calculated loss value is larger. For example, two RNA sequences are similar, but the two generated RNA vectors are not similar, and the calculated loss value at this time is relatively large. By training the vector model continuously based on $L_1$, the RNA vector learned by the vector model can more accurately reflect the similarity between RNA sequences.

Similarly, for the second item of the objective function, the similarity of the protein-protein pair calculated in step S260 can be taken as the label value, and after obtaining more than one first protein vector through the vector model, the similarity of any two first protein vectors can be calculated, and the loss value of the second item can be calculated according to the similarity and the corresponding label value, that is, according to:

$$L_2 = \Sigma_{i,j} \left\| \frac{\langle v_i^P, v_j^P \rangle}{|v_i^P||v_j^P|} - simP(p_i, p_j) \right\|^2. \tag{15}$$

Among them, $v_i^P$ represents the i-th first protein vector, $v_j^P$ represents the j-th first protein vector, $p_i$ represents the i-th protein sequence, $p_j$ represents the j-th protein sequence, $\frac{\langle v_i^P, v_j^P \rangle}{|v_i^P||v_j^P|}$ represents the similarity of two first protein vectors, $simP(p_i, p_j)$ represents the similarity of two protein sequences, that is, the label value. When calculating $L_2$, if the similarity of the two first protein vectors is closer to the similarity of the corresponding two protein sequences, the calculated loss value is smaller, indicating that when the two protein sequences are similar, the generated protein vectors are also similar. Or, when the two protein sequences are not similar, the generated protein vectors are also not similar. Conversely, when the similarity of the two first protein vectors is far from the similarity of the corresponding two protein sequences, the calculated loss value is larger. By training the vector model continuously based on $L_2$, the protein vector learned by the vector model can more accurately reflect the similarity between protein sequences.

For the third item of the objective function, the loss value of the first item can be calculated according to the probability value of presence of the interaction between the RNA sequence and the protein sequence and label value. For example, the cross-entropy loss function can be chosen as the third term of the objective function. Specifically, the cross-entropy loss function can be:

$$L_3 = -\Sigma_{i=1}^K \left( y_i \log p(1|v_i^R, v_i^P)^{y_i} + (1 - y_i) \log p(0|v_i^R, v_i^P)^{(1-y_i)} \right). \tag{16}$$

Among them, $v_i^R$ represents the i-th first RNA vector, $v_i^P$ represents the i-th first protein vector, $y_i$ represents the label value of the i-th RNA-protein pair in the training data set, and $p(1|v_i^R, v_i^P)$ represents the probability value of presence of the interaction between the i-th RNA-protein pair in the training data set, $p(0|v_i^R, v_i^P)$ represents the probability value of absence of the interaction between i-th RNA-protein pair in the training data set, and K is the sequence number of the RNA sequences and the protein sequences.

In this exemplary embodiment, the RNA-protein pairs in the training data set are all positive RNA-protein pairs, that is, the label value $y_i=1$. Therefore, formula (16) can be changed into:

$$L_3 = -\Sigma_{i=1}^{K}\log p(1|v_i^R, v_j^P). \quad (17)$$

When calculating $L_3$, the closer $p(1|v_i^R, v_i^P)$ to 1, the smaller the calculated loss value is, and the closer $p(1|v_i^R, v_i^P)$ to 0, the greater the calculated loss value is. By training the vector model continuously based on $L_3$, the RNA vector and the protein vector learned by the vector model can more accurately reflect the interaction relationship between the RNA sequence and the protein sequence.

In the exemplary embodiments of the present disclosure, in order to make the RNA vector and the protein vector learned by the vector model can simultaneously reflect the interaction relationship between the RNA sequence and the protein sequence, the similarity between the RNA sequences and the similarity between the protein sequences, the constructed objective function can be:

$$L = -\alpha L_3 - \beta L_1 - \gamma L_2 \quad (18)$$

that is:

$$L = -\alpha\Sigma_{i=1}^{K}\log p(1|v_i^R, v_i^P) - \\ \beta\Sigma_{i,j}\left\|\frac{\langle v_i^R, v_j^R\rangle}{\|v_i^R\|\|v_j^R\|} - simR(r_i, r_j)\right\|^2 - \gamma\Sigma_{i,j}\left\|\frac{\langle v_i^P, v_j^P\rangle}{\|v_i^P\|\|v_j^P\|} - simP(p_i, p_j)\right\|^2 \quad (19)$$

Among them, $r_i$ represents the i-th RNA sequence, $r_j$ represents the j-th RNA sequence, $p_i$ represents the i-th protein sequence, $p_j$ represents the j-th protein sequence, $v_i^R$ represents the i-th first RNA vector, $v_i^P$ represents the i-th first protein vector, and K is the sequence number of RNA sequences and protein sequences. $\alpha$, $\beta$, and $\gamma$ are model hyperparameters, $0<\alpha$, $\beta$, $\gamma<1$, and $\alpha+\beta+\gamma=1$, such as $\alpha=0.6$, $\beta=0.2$, $\gamma=0.2$.

The model parameters of the vector model can be continuously trained based on the objective function L. Among them, the model parameters may be network parameters of the first part of model in the vector model, such as weight parameters and bias parameters, parameter matrices such as mapping matrices $W_1$, $W_2$, and model parameters of the second part of model in the vector model, for example $\theta$. For example, a stochastic gradient descent algorithm may be used to update model parameters. According to the principle of backpropagation, the objective function L is continuously calculated, and all model parameters of the vector model are simultaneously updated according to the calculated loss value. When the objective function L converges to the minimum value, the training of all model parameters is completed. The RNA vector and the protein vector learned by the trained vector model can more accurately reflect the interaction relationship between RNA sequences and protein sequences, the similarity between RNA sequences and the similarity between protein sequences. In other examples, the model parameters can also be updated iteratively in reverse, and when the preset number of iterations is satisfied, the training of all model parameters is completed. After the iteration is completed, the optimized model parameters can be obtained. It is also possible to minimize the objective function by alternating least square method, Adam optimization algorithm, etc., and update the parameters sequentially from the back to the front, so as to optimize the model parameters, which is not limited in the present disclosure.

In an example implementation, when the first part of model in the vector model consists of an Embedding network and a recurrent neural network, the parameters in the vector model can be trained simultaneously. For example, with L as the objective function, the model parameter $\theta$ of the second part of model in the vector model can be adjusted first, and then the network parameters such as weight parameters and bias parameters in the recurrent neural network can be adjusted, and further backpropagated to the Embedding network to adjust the mapping matrices $W_1$, $W_2$. Through more than one layer-by-layer backpropagation, each model parameter can eventually converge, or the training will terminate after a certain number of iterations are satisfied. Through such a training manner, the two parts of models in the vector model can be trained at the same time, ensuring higher precision and accuracy of each model, and improving training efficiency at the same time. After the training is completed, the final vector model can be used to output the RNA vector and the protein vector for generating negative samples.

Figure 5:
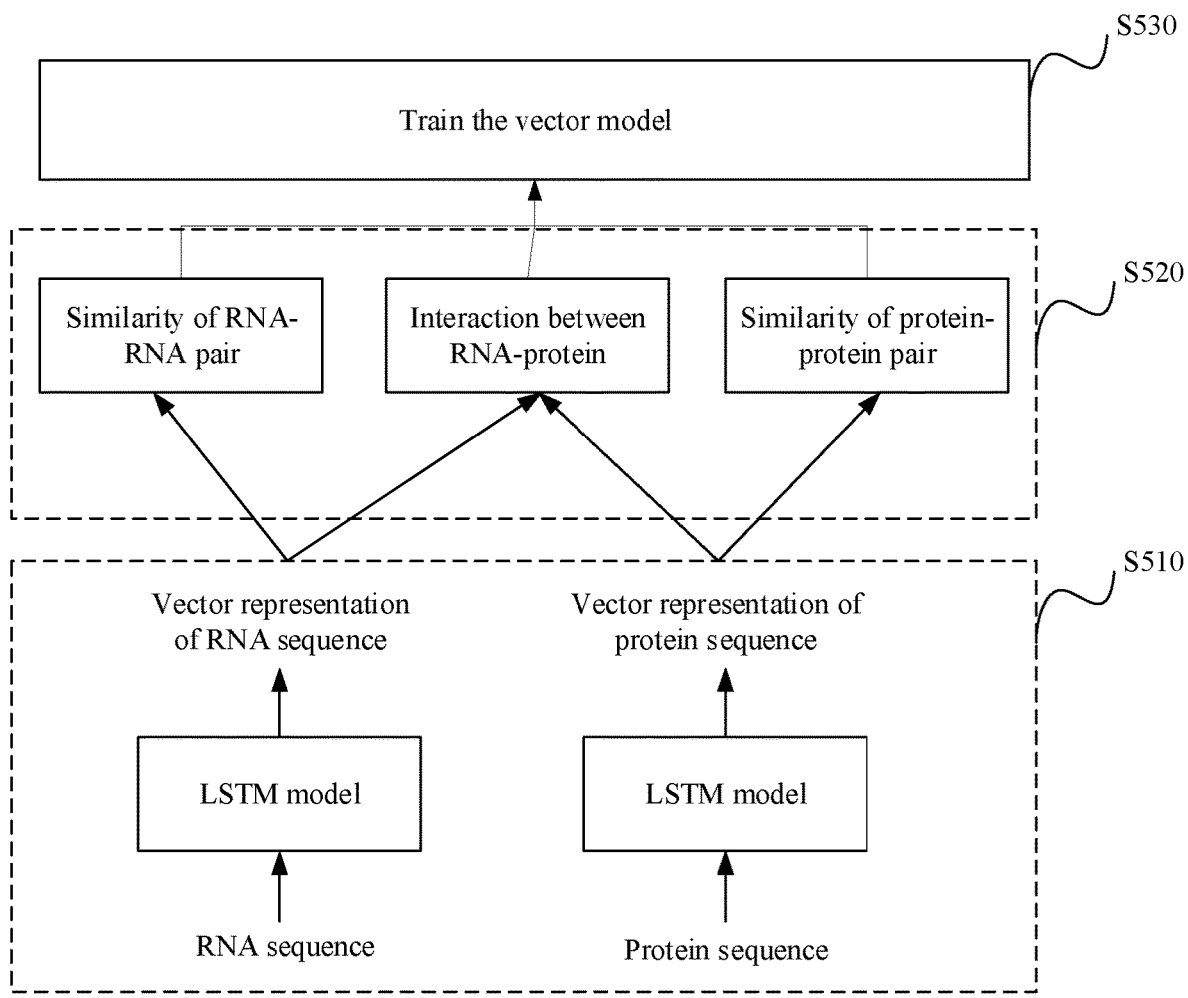
FIG. 5 schematically shows a flow chart of a method for training a vector model according to a specific embodiment of the present disclosure.

In a specific example implementation, as shown in FIG. 5, the vector model may be trained according to step S510 to step S530. Among them, the first part of model in the vector model is the LSTM model. After obtaining a dataset containing more than one RNA sequence and more than one protein sequence:

In step S510, the RNA sequence in the data set is input into the LSTM model to obtain a vector representation of the RNA sequence, and at the same time the protein sequence in the data set is input into the LSTM model to obtain a vector representation of the protein sequence.

In step S520, a similarity of an RNA-RNA pair, a similarity of a protein-protein pair and an interaction between RNA-protein is determined. Specifically, a sequence distance between any two RNA sequences in the obtained data set can be calculated to obtain the similarity of more than one RNA-RNA sequence. A sequence distance between any two protein sequences in the obtained data set can be calculated to obtain the similarity of more than one protein-protein pair. The probability of presence of an interaction between the RNA sequence and the protein sequence and/or the probability of absence of an interaction between the RNA sequence and the protein sequence can be calculated based on the vector representation of the RNA sequence and the vector representation of the protein sequence, further to determine the interaction between RNA-protein.

In step S530, a vector model is trained. An objective function can be constructed according to the interaction between the RNA sequence and the protein sequence, the similarity of RNA-RNA pair and the similarity of protein-protein pair. Based on the objective function, the model parameters of the vector model can be iteratively updated using the stochastic gradient descent algorithm, and the training of the vector model is completed when an iteration termination condition is satisfied.

Figure 6:
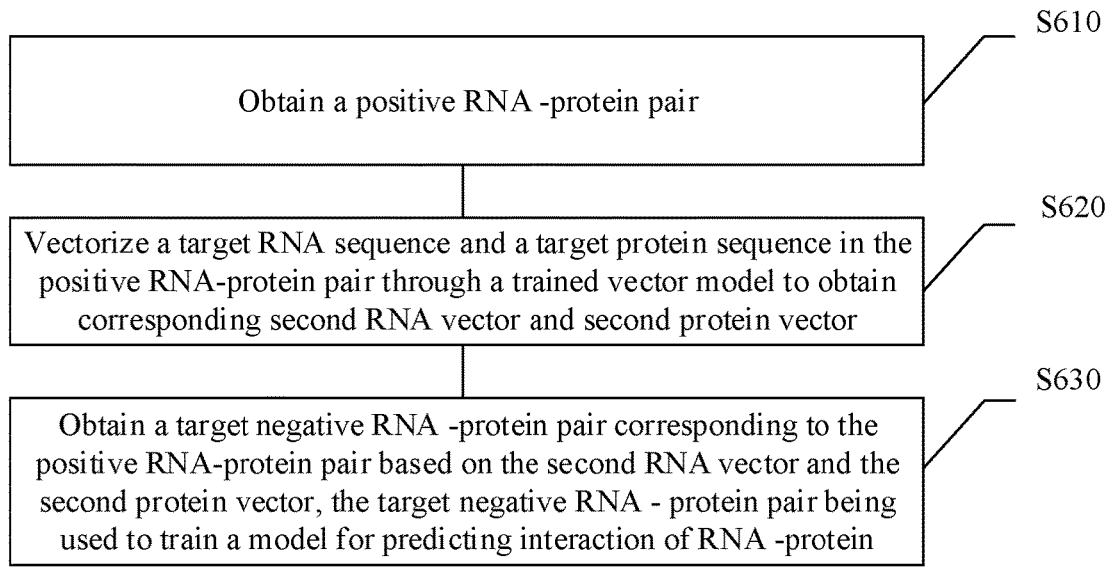
FIG. 6 schematically shows a flow chart of a method for generating a negative sample according to some embodiments of the present disclosure.

The exemplary embodiment of the present disclosure also provides a method for generating a negative sample, which can be applied to the above-mentioned server 105, and can also be applied to one or more of the above-mentioned terminal devices 101, 102, 103, which is not specifically limited in the exemplary embodiment. Referring to FIG. 6, the method for generating a negative sample may include the following steps S610 to S630:

In step S610, a positive RNA-protein pair is obtained;

In step S620, the target RNA sequence and the target protein sequence in the positive RNA-protein pair are vectorized through a trained vector model to obtain a corresponding second RNA vector and second protein vector;

In step S630, the target negative RNA-protein pair corresponding to the positive RNA-protein pair is obtained based on the second RNA vector and the second protein vector, and the target negative RNA-protein pair is used for training a prediction model for RNA-protein interaction.

In the method for generating the negative sample provided by the exemplary embodiments of the present disclosure, by obtaining a positive RNA-protein pair, the target RNA sequence and the target protein sequence in the positive RNA-protein pair are vectorized through a trained vector model to obtain a corresponding second RNA vector and second protein vector; the target negative RNA-protein pair corresponding to the positive RNA-protein pair is obtained based on the second RNA vector and the second protein vector, and the target negative RNA-protein pair is used for training a prediction model for RNA-protein interaction. On the one hand, when using the vector model trained based on multi-task learning to generate negative samples, it can ensure that the negative samples are similar to known positive samples, which improves the quality of negative samples; on the other hand, when training a prediction model for RNA-protein interaction using high-quality negative samples, the prediction model for RNA-protein interaction can learn more useful classification information, thus improving the accuracy of RNA-protein interaction prediction.

In the following, the above steps of the example embodiments of the present disclosure will be described in more detail.

In step S610, a positive RNA-protein pair is obtained.

the present disclosure, a negative sample, that is, a negative RNA-protein pair, can be used to train a prediction model for RNA-protein interaction. During the training process of the prediction model, the performance of the model can be improved by continuously learning classification information, that is, the accuracy of RNA-protein interaction prediction can be improved. In order for the prediction model to learn more useful classification information, it is necessary to use high-quality positive and negative samples to train the prediction model. The present disclosure mainly describes the generation of high-quality negative samples. When generating negative samples, a positive sample set {(RNA$_i$, pro$_i$), i=1, ..., K} can be obtained, which contains K positive RNA-protein pairs, or any number of positive RNA-protein pairs can be obtained, and a negative RNA-protein pair similar to each positive RNA-protein pair is generated according to each positive RNA-protein pair.

In step S620, the target RNA sequence and target protein sequence in the positive RNA-protein pair is vectorized through the trained vector model to obtain a corresponding second RNA vector and second protein vector.

The RNA vector and protein vector learned by a trained vector model in some embodiments of the present disclosure can more accurately reflect the interaction relationship between RNA sequences and protein sequences, the similarity between RNA sequences and the similarity between protein sequences. For example, the RNA sequence and the protein sequence in each positive RNA-protein pair can be mapped into a vector using the first part of model in the trained vector model, such as a neural network, to obtain the corresponding second RNA vector and second protein vector. For example, for the i-th positive RNA-protein pair (RNA$_i$, pro$_i$), the RNA sequence RNA$_i$ can be vectorized by the trained first neural network to obtain the second RNA vector dr$_i$, and the protein sequence pro$_i$ can be vectorized by the trained second neural network to obtain the second protein vector dp$_i$, and the first neural network and the second neural network can be the same or different. It can be understood that, in order to facilitate the subsequent calculation of the interaction between RNA sequences and protein sequences, any RNA sequence and any protein sequence can be vectorized through the first part of model in the trained vector model to obtain the corresponding second RNA vector and the second protein vector.

In step S630, the target negative RNA-protein pair corresponding to the positive RNA-protein pair is obtained based on the second RNA vector and the second protein vector, and the target negative RNA-protein pair is used to train a prediction model for RNA-protein interaction.

The target negative sample needs to be similar to the positive sample, and indeed a negative sample. Taking the i-th positive RNA-protein pair (RNA$_i$, pro$_i$) as an example, when generating the target negative RNA-protein pair corresponding to the positive RNA-protein pair, pro$_i$ in the i-th positive RNA-protein pair can be fixed. When an RNA is similar to RNA$_i$, and there is no interaction between the RNA and pro$_i$, the RNA-protein pair composed of the RNA and pro$_i$ can be taken as a target negative sample. Similarly, RNA$_i$ in the i-th positive RNA-protein pair can also be fixed. When a protein is similar to pro$_i$ and there is no interaction between the protein and RNA$_i$, the RNA-protein pair composed of the protein and RNA$_i$ can also be as a target negative sample.

Figure 7:
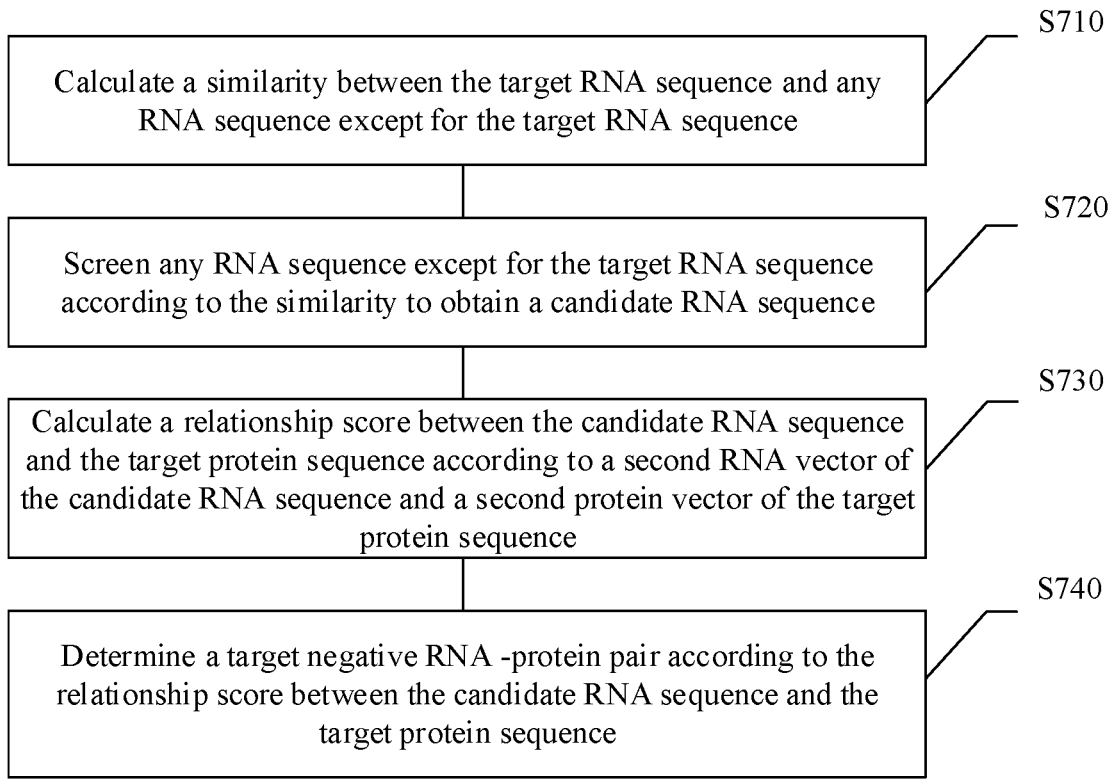
FIG. 7 schematically shows a flowchart of a method for generating a negative sample according to a specific embodiment of the present disclosure.

In an exemplary implementation, as shown in FIG. 7, the target negative sample corresponding to each positive RNA-protein pair can be generated according to steps S710 to S740.

In step S 710, the similarity between the target RNA sequence and any RNA sequence except for the target RNA sequence is calculated.

When obtaining the negative sample corresponding to the i-th positive RNA-protein pair (RNA$_i$, pro$_i$) in the positive sample set {(RNA$_i$, pro$_i$), i=1, ..., K}, the target RNA sequence is RNA$_i$, the target protein sequence is pro$_i$, and any RNA sequence except for RNA$_i$ in the positive sample set is RNA$_j$(j=1, ..., K, j≠i). When pro$_i$ is fixed, the similarity between RNA$_i$ and any RNA sequence except for RNA$_i$ can be calculated. For example, the similarity between the second RNA vector of RNA$_i$ and the second RNA vector of RNA$_j$ can be calculated, that is, according to:

$$S(dr_j, dr_i) = \frac{\langle dr_j, dr_i \rangle}{\sqrt{\langle dr_j, dr_j \rangle} \sqrt{\langle dr_i, dr_i \rangle}}, \quad (20)$$

the similarity of RNA$_i$ and RNA$_j$ is calculated; Among them, dr$_i$ represents the second RNA vector of RNA$_i$, dr$_j$ represents the second RNA vector of RNA$_j$, $\langle dr_j, dr_i \rangle$ represents the dot product operation of dr$_i$ and dr$_j$, $\sqrt{\langle dr_j, dr_j \rangle}$ represents the modulus length of dr$_j$, $\sqrt{\langle dr_i, dr_i \rangle}$ represents the modulus length of $dr_i$, $S(dr_j, dr_i)$ represents the cosine value of the angle between $dr_j$ and $dr_i$, and the closer the cosine value is to 1, the closer the angle is to 0 degrees, that is, the higher the similarity of $dr_j$ and $dr_i$. In addition to calculating the cosine distance of two second RNA vectors according to formula (20), the Euclidean distance, the Mahalanobis distance, etc. of two second RNA vectors can also be calculated to obtain the similarity of two RNA sequences. In other examples, the similarity between two RNA sequences can be determined by calculating the distance between the two RNA sequences by referring to step S250 in the method for training a vector model of the present disclosure, which is not specifically limited in the present disclosure.

In step S720, any RNA sequence except for the target RNA sequence is screened according to the similarity to obtain a candidate RNA sequence.

After calculating the similarity between $RNA_i$ and $RNA_j$, the RNA sequences $RNA_j$(j=1, ..., K, j≠i) except for the target RNA sequence in the positive sample set can be screened according to the similarity to obtain more than one candidate RNA sequence. For example, other RNA sequences except for the target RNA sequence in the positive sample set can be sorted in descending order according to the similarity, and a certain number (for example, 20) of the RNA sequences are selected as candidate RNA sequences. Other RNA sequences except for the target RNA sequence in the positive sample set can also be sorted in ascending order according to the similarity, and a certain number (for example, 20) RNA sequences are selected as candidate RNA sequences. A similarity threshold can also be set in advance, and RNA sequences that satisfy the similarity threshold can be taken as candidate RNA sequences. For example, the similarity threshold can be set to 0.2 or 0.5, which is not specifically limited in the present disclosure. For example, RNA sequences with similarity greater than the similarity threshold can be taken as candidate RNA sequences.

In step S730, the relationship score between the candidate RNA sequence and the target protein sequence is calculated according to the second RNA vector of the candidate RNA sequence and the second protein vector of the target protein sequence.

For example, based on the model parameters of the vector model in some embodiments of the present disclosure, and according to the second RNA vector of the candidate RNA sequence and the second protein vector of the target protein sequence, the relationship score between the candidate RNA sequence and the target protein sequence can be calculated. Among them, the model parameters are obtained by training the vector model.

After obtaining more than one candidate RNA sequence, the interaction relationship between each candidate RNA sequence and the target protein sequence $pro_i$ can be calculated in turn. For example, according to:

$$x_j = \theta \cdot \langle dr_j, dp_i \rangle, \quad (21)$$

a relationship score $x_j$ between the candidate RNA sequence and the target protein sequence is calculated; where, $dr_j$ is the second RNA vector of the candidate RNA sequence, and $dp_i$ is the second protein vector of the target protein sequence. It can be seen from formula (7) that when the relationship score $x_j>0$, then $p(1|(dr_j, dp_i))<0.5$, it can indicate that there is more than 50% probability of absence of interaction between the candidate RNA sequence and the target protein sequence, that is, the RNA-Protein pair composed of the candidate RNA sequence and the target protein sequence can serve as a candidate negative sample.

In step S740, the target negative RNA-protein pair is determined according to the relationship score between the candidate RNA sequence and the target protein sequence.

For example, when the relationship score between the candidate RNA sequence and the target protein sequence satisfies a preset condition, a first negative sample set can be obtained from one or more candidate RNA sequences satisfying the preset condition. The target negative RNA-protein pair can be determined according to the first negative sample set. For example, a first sampling probability can be determined according to the relationship score between the candidate RNA sequence and the target protein sequence, and a candidate RNA sequence that can replace the target RNA sequence is selected from the first negative sample set according to the first sampling probability, and the target negative RNA-protein pair can be composed of the candidate RNA sequence and the target protein sequence.

Specifically, an empty set T={ } can be given in advance. After obtaining the relationship scores between all candidate RNA sequences and the i-th target protein sequence, ($RNA_j$, $x_j$) with the relationship score $x_j>0$ can be put into the set T. If T is an empty set, it can indicate that no negative RNA-protein pair can be generated based on the i-th positive RNA-protein pair ($RNA_i$, $pro_i$). If T is not an empty set, the first sampling probability $\{p_k, k=1, ..., |T|\}$ can be determined according to the relationship score between the candidate RNA sequence and the target protein sequence, that is, according to:

$$p_k = \frac{x_k}{\sum_{l=1}^{l=|T|} x_l}, \quad (22)$$

the first sampling probability $p_k$ is obtained; where, $|T|$ represents the number of elements in the set T, the k-th element is ($RNA_j$, $x_j$), $x_k$ represents the relationship score between a candidate RNA sequence and the target protein sequence, and $\sum_{l=1}^{l=|T|} x_l$ represents the sum of relationship scores between all candidate RNA sequences and the target protein sequence. Then, L candidate RNA sequences can be sampled from the set T according to the first sampling probability $p_k$. The specific value of L is not limited in the present disclosure, that is, any number of candidate RNA sequences can be sampled according to actual needs, and the corresponding target negative RNA-protein pair can be composed of any number of candidate RNA sequences and the target protein sequence.

For example, the obtained positive sample set may include 10 positive RNA-protein pairs. For the first positive RNA-protein pair ($RNA_1$, $pro_1$), when $pro_1$ is fixed, the similarity between $RNA_1$ and $RNA_2$, $RNA_3$ ... $RNA_{10}$ can be calculated respectively. For example, the top four $RNA_3$, $RNA_5$, $RNA_7$ and $RNA_9$ in similarity ranking can be taken as candidate RNA sequences, and then the relationship scores of $pro_1$ with $RNA_3$, $RNA_5$, $RNA_7$, $RNA_9$ can be calculated sequentially, which are recorded as $x_3$, $x_5$, $x_7$, $x_9$. For example, $RNA_5$, $RNA_7$ and $RNA_9$ with relationship scores greater than 0 can be put into the set T. At this time, the set T includes 3 elements in total, namely (RNA$_5$, x$_5$), (RNA$_7$, x$_7$) and (RNA$_9$, x$_9$). It may be illustrated by taking that the calculated x$_5$, x$_7$ and x$_9$ are respectively 1, 2, and 3 as an example, correspondingly, the first sampling probability $$p_1 = \frac{1}{1+2+3} = \frac{1}{6}$$

corresponding to the RNA$_5$, the first sampling probability p$_2$=⅓ corresponding to RNA$_7$, and the first sampling probability p$_3$=½ corresponding to RNA$_9$. For example, when one candidate RNA sequence is sampled from the set T, the probability of obtaining RNA$_5$ is ⅙, the probability of obtaining RNA$_7$ is ⅓, and the probability of obtaining RNA$_9$ is ½. It can be seen that the greater the relationship score between the target protein and the candidate RNA sequence is, the smaller the calculated probability of presence of interaction between the two is, that is, the greater the probability of absence of interaction is larger. Correspondingly, the greater the relationship score between the target protein and the candidate RNA sequence, the greater the corresponding sampling probability is, indicating that the candidate RNA sequence with a higher probability of absence of interaction with the target protein is easier to be selected during the sampling process, and it is further ensured that the generated negative samples are similar to the known positive samples and are indeed negative samples. It should be noted that step S720 can also be omitted in the exemplary embodiments, that is, after calculating the similarity between the target RNA sequence and any RNA sequence in the positive sample set except for the target RNA sequence, it is not necessary to screen all RNA sequences except for the target RNA sequence in the positive sample set according to the similarity, but take all RNA sequences in the positive sample set except for the target RNA sequence as candidate RNA sequences, and based on the relationship scores between each candidate RNA sequence and target protein sequence, the final target negative RNA-protein pair is determined. In the exemplary embodiments, step S710 and step S720 can also be omitted, that is, it is not necessary to calculate the similarity between the target RNA sequence and any RNA sequence except for the target RNA sequence in the positive sample set, but all RNA sequences in the set except for the target RNA sequence are taken as candidate RNA sequences. In step S740 in the exemplary implementation, the RNA-protein pairs composed of all candidate RNA sequences with the relationship score x$_j$>0 and target protein sequences can be taken as target negative samples without sampling processing, or, all candidate RNA sequences with the relationship score x$_j$>0 are randomly sampled, and the RNA-protein pair composed of the sampled candidate RNA sequence and the target protein sequence can be taken as the target negative sample. One or more candidate RNA sequences satisfying the preset condition in the first negative sample set can form a target negative sample with the target protein sequence. In addition, steps S730 and S740 can also be omitted in the exemplary embodiments, that is, the RNA-protein pair composed of the candidate RNA sequence screened according to the similarity and the target protein sequence can be taken as the target negative sample, for example, candidate RNA sequences with less similarity can be selected to form the target negative sample with the target protein sequence.

Figure 8:
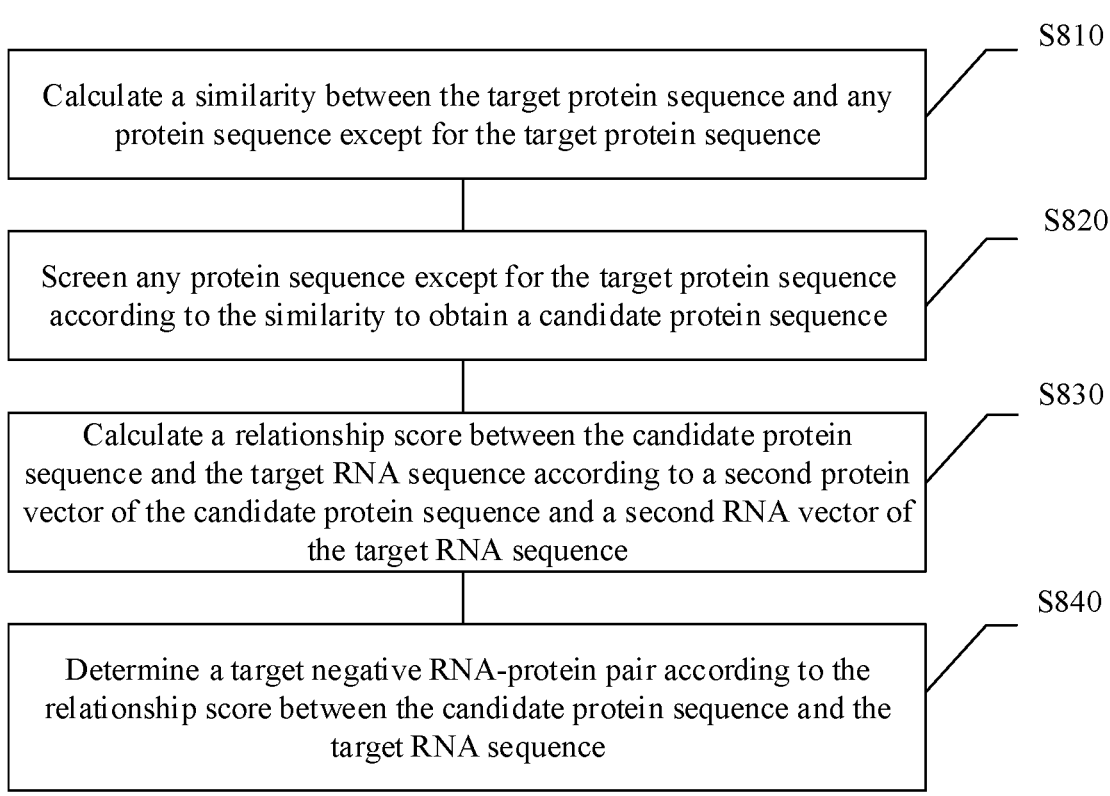
FIG. 8 schematically shows a flowchart of a method for generating a negative sample according to another specific embodiment of the present disclosure.

In another example implementation, as shown in FIG. 8, the target negative sample corresponding to each positive RNA-protein pair can be generated according to steps S810 to S840.

In step S810, the similarity between the target protein sequence and any protein sequence except for the target protein sequence.

After obtaining the negative sample corresponding to the i-th positive RNA-protein pair (RNA$_i$, pro$_i$) in the positive sample set {(RNA$_i$, pro$_i$), i=1, . . . , K}, the target protein sequence is pro$_i$, the target RNA sequence is RNA$_i$, and any protein sequence except for pro$_i$ in the positive sample set is pro$_j$(j=1, . . . , K, j≠i). When RNA$_i$ is fixed, the similarity between pro$_i$ and any protein sequence except for pro$_i$ in the positive sample set can be calculated. For example, the similarity between the second protein vector of pro$_i$ and the second protein vector of pro$_j$ can be calculated, that is, according to:

$$S(dp_j, dp_i) = \frac{\langle dp_j, dp_i \rangle}{\sqrt{\langle dp_j, dp_j \rangle} \sqrt{\langle dp_i, dp_i \rangle}}, \quad (23)$$

the similarity between pro$_i$ and pro$_j$ is calculated. Among them, dp$_i$ represents the second protein vector of pro$_j$, dp$_j$ represents the second protein vector of pro$_i$, ⟨dp$_j$, dp$_i$⟩ represents dot product operation of dp$_i$ and dp$_j$, $\sqrt{\langle dp_j, dp_j \rangle}$ represents the modulus length of dp$_j$, $\sqrt{\langle dp_i, dp_i \rangle}$ represents the modulus length of dp$_i$, S(dp$_j$, dp$_i$) represents the cosine value of the angle between dp$_i$ and dp$_j$, the closer the cosine value is to 1, the closer the angle is to 0 degrees, that is, the higher the similarity of dp$_i$ and dp$_j$ is. In addition to calculating the cosine distance of two second protein vectors according to formula (23), the Euclidean distance, the Mahalanobis distance, etc., of two second protein vectors can also be calculated to obtain the similarity of two protein sequences. In other examples, the similarity of two protein sequences can be determined by calculating the distance of the two protein sequences by referring to step S260 in the method for training a vector model of the present disclosure, which is not specifically limited in the present disclosure.

In step S820, any protein sequence except for the target protein sequence is screened according to the similarity to obtain a candidate protein sequence.

After calculating the similarity between pro$_i$ and pro$_j$, other protein sequences pro$_j$(j=1, . . . , K, j≠i) in the positive sample set except for the target protein sequence can be screened according to the similarity to obtain more than one candidate protein sequences. For example, other protein sequences in the positive sample set except for the target protein sequence can be sorted in descending order according to the similarity, and a certain number (for example, 20) of protein sequences can be selected as candidate protein sequences. Other protein sequences in the positive sample set except for the target protein sequence can also be sorted in ascending order according to the similarity, and a certain number (for example, 20) of protein sequences can be selected as candidate protein sequences. A similarity threshold can also be set in advance, and protein sequences that satisfy the similarity threshold can be taken as candidate protein sequences. For example, the similarity threshold can be set to 0.2 or 0.5, which is not specifically limited in the present disclosure. For example, a protein sequence with similarity greater than a similarity threshold can be taken as a candidate protein sequence.

In step S830, the relationship score between the candidate protein sequence and the target RNA sequence is calculated according to the second protein vector of the candidate protein sequence and the second RNA vector of the target RNA sequence.

For example, based on the model parameters of the vector model in some embodiments of the present disclosure, and according to the second protein vector of the candidate protein sequence and the second RNA vector of the target RNA sequence, the relationship score between the candidate protein sequence and the target RNA sequence can be calculated. Among them, the model parameters are obtained by training the vector model.

After obtaining more than one candidate protein sequence, the interaction relationship between each candidate protein sequence and the target RNA sequence $RNA_i$ can be calculated in turn. For example, according to:

$$y_j = \theta \cdot \langle dp_j, dr_i \rangle, \quad (24)$$

a relationship score $y_j$ between the candidate protein sequence and the target RNA sequence is calculated; Among them, $dp_j$ is the second protein vector of the candidate protein sequence, and $dr_i$ is the second RNA vector of the target RNA sequence. It can be seen from formula (7) that when the relationship score $y_j>0$, then $p(1|(dp_j, dr_i))<0.5$, it can indicate that there is more than 50% probability of absence of interaction between the candidate protein sequence and the target RNA sequence, that is, the RNA-protein pair composed of the candidate protein sequence and the target RNA sequence can be served as candidate negative sample.

In step S840, the target negative RNA-protein pair is determined according to the relationship score between the candidate protein sequence and the target RNA sequence.

For example, when the relationship score between the candidate protein sequence and the target RNA sequence satisfies the preset condition, a second negative sample set can be obtained from one or more candidate protein sequences satisfying the preset condition. The target negative RNA-protein pair can be determined according to the second negative example set. For example, a second sampling probability can be determined according to the relationship score between the candidate protein sequence and the target RNA sequence, and a candidate protein sequence that can replace the target protein sequence is selected from the second negative sample set according to the second sampling probability, and the target negative RNA-protein pair is constituted by the candidate protein sequence and the target RNA sequence.

In particular, an empty set T={ } can likewise be set in advance in the same way. After obtaining the relationship scores between all candidate protein sequences and target RNA sequences, ($pro_j$, $y_j$) with the relationship scores $y_j>0$ can be put into the set T. If T is an empty set, it can indicate that no negative RNA-protein pair can be generated based on the i-th positive RNA-protein pair ($RNA_i$, $pro_i$). If T is not an empty set, the second sampling probability {$p_f$, f=1, . . . , |T|} can be determined according to the relationship score between the candidate protein sequence and the target RNA sequence, that is, according to:

$$p_f = \frac{y_f}{\sum_{l=1}^{l=|T|} y_l}, \quad (25)$$

the second sampling probability $p_f$ is obtained; where, |T| represents the number of elements in the set T, the f-th element is ($pro_j$, $y_j$), $y_f$ represents the relationship score between a certain candidate protein sequence and the target RNA sequence, and $\sum_{l=1}^{l=|T|} y_l$ represents the sum of relationship scores between all candidate protein sequences and target RNA sequences. Then, L candidate protein sequences can be sampled from the set T according to the second sampling probability $p_f$. The specific value of L is not limited in the present disclosure, that is, any number of candidate protein sequences can be sampled according to actual needs, and the corresponding target negative RNA-protein pair be composed of any number of candidate protein sequences and the target RNA sequence. The specific sampling process is similar to the selection of target candidate RNA sequences in step S740, and will not be repeated here.

Similarly, step S820 can also be omitted in this example embodiment, that is, after calculating the similarity between the target protein sequence and any protein sequence in the positive sample set except for the target protein sequence, it is not necessary to screen all protein sequences in the positive sample set except for the target protein sequence, but take all protein sequences in the positive sample set except for the target protein sequence as candidate RNA sequences as candidate protein sequences, and the final target negative RNA-protein pair is determined based on the relationship scores between each candidate protein sequence and the target RNA sequence. In the exemplary embodiments, step S810 and step S820 can also be omitted, that is, it is not necessary to calculate the similarity between the target RNA sequence and any protein sequence in the positive sample set except for the target protein sequence, but take all protein sequences in the positive sample set except for the target protein sequence as candidate RNA sequences. In step S840 in this exemplary implementation, the RNA-protein pairs composed of all candidate protein sequences with a relationship score $y_j>0$ and target RNA sequences can also be taken as target negative samples without sampling processing, or, all the candidate protein sequences with the relationship score $y_j>0$ are randomly sampled, and the RNA-protein pair composed of the sampled candidate protein sequence and the target RNA sequence can be taken as the target negative sample. One or more candidate protein sequences satisfying the preset condition in the first negative sample set can form a target negative sample with the target RNA sequence. In addition, steps S830 and S840 can also be omitted in this exemplary embodiment, that is, the RNA-protein pair composed of the candidate protein sequence and the target RNA sequence screened according to the similarity can be taken as the target negative sample, for example, candidate protein sequences with less similarity and can be selected to form the target negative sample with the target RNA sequence.

In an example embodiment, the vector model used to generate the second RNA vector and the second protein vector may be pre-trained. For example, a training data set can be obtained, and the training data set can be composed of more than one RNA-protein pair, for example, can be composed of more than one positive RNA-protein pair. The interaction between the RNA sequence and the protein sequence in the training data set, the similarity of the RNA-RNA pair and the similarity of the protein-protein pair can be determined through the vector model, and according to the relationship between the RNA sequence and the protein sequence Interaction, the similarity of RNA-RNA pair and the similarity of protein-protein pair, the objective function can be constructed. Finally, the stochastic gradient descent algorithm can be used to iteratively update the model parameters of the vector model based on the constructed objective function, and the training of the vector model is completed when an iteration termination condition is satisfied. The specific training process of the vector model can be the method for training a vector model provided by some embodiments of the present disclosure. For example, the specific training process of the vector model is similar to step S210 to step S270 in the method for training a vector model of the present disclosure, which will not be described here in detail.

In some embodiments, the prediction model for RNA-protein interaction can be trained using the negative sample generated from step S610 to step S630 in the method for generating a negative sample of the present disclosure. After the training is completed, the RNA-protein pair to be predicted can be obtained, and the prediction model for RNA-protein interaction is used to predict the interaction of the RNA-protein pair to be predicted, and according to the prediction result, it is determined whether there is interaction in the RNA-protein pair to be predicted. At the same time, the prediction result of the interaction of the RNA-protein to be predicted can also be output to the terminal device for users to view. For example, the prediction result may be directly displayed on the display screen of the terminal device, or the prediction result may be provided to the user through voice broadcast, which is not specifically limited in the embodiment.

In the exemplary implementation of the present disclosure, on the one hand, when using the vector model trained based on multi-task learning to generate negative samples, it can ensure that the negative samples are similar to known positive samples, which improves the quality of negative samples; on the other hand, when training the prediction model for RNA -protein interaction with high-quality negative samples, the prediction model for RNA-protein interaction can learn more useful classification information, thus improving the accuracy of RNA-protein interaction prediction.

Figure 9:
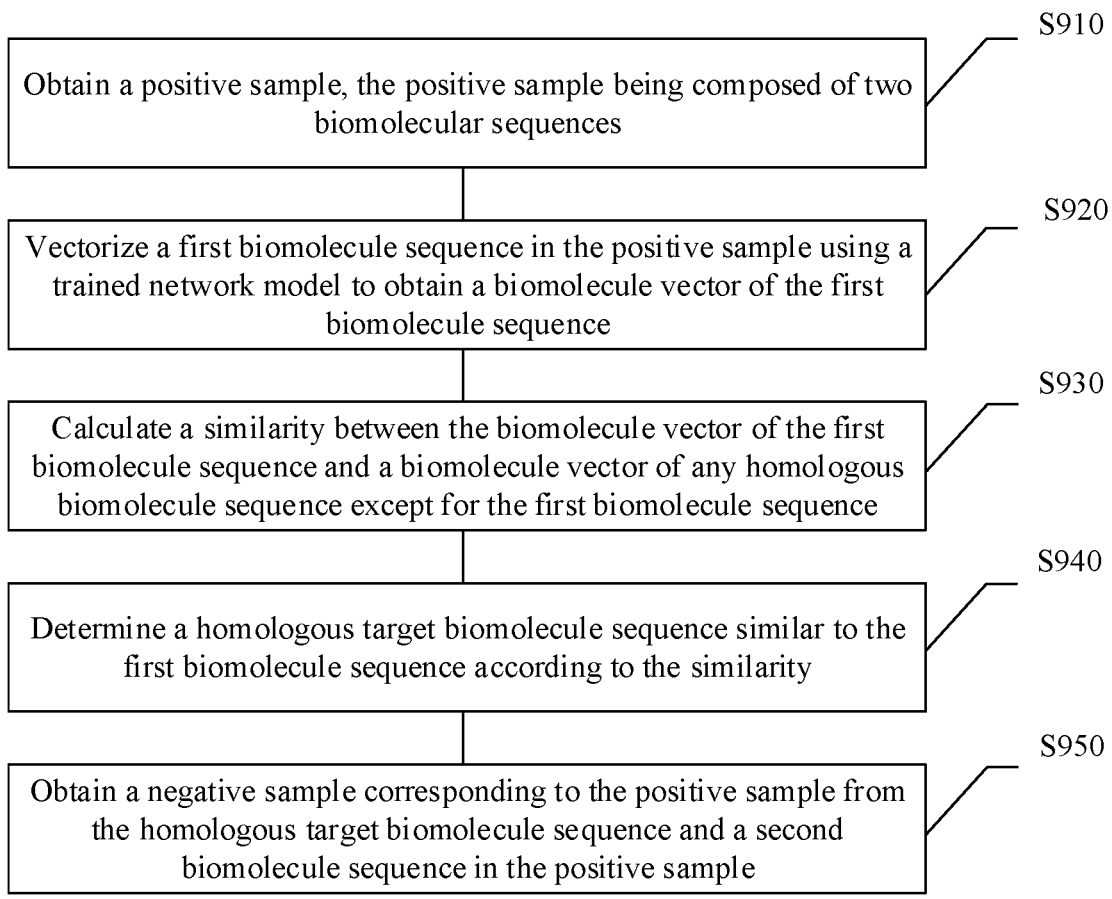
FIG. 9 schematically shows a flow chart of a method for generating a negative sample according to another embodiment of the present disclosure.

The exemplary embodiment of the present disclosure also provides a method for generating a negative sample, which can be applied to the above-mentioned server 105, and can also be applied to one or more of the above-mentioned terminal devices 101, 102, 103 which is not specifically limited in the exemplary embodiment. Referring to FIG. 9, the method for generating a negative sample may include the following steps S 910 to S 950:

In step S910, a positive sample is obtained, and the positive sample consists of two biomolecular sequences.

Still taking the two biomolecules of RNA and protein as examples, any number of positive RNA-protein pairs can be obtained, and each RNA-protein pair consists of RNA sequence and protein sequence. In each RNA-protein pair, the first biomolecule sequence can be an RNA sequence and the second biomolecule sequence can be a protein sequence. It can be understood that the first biomolecule sequence can also be a protein sequence, and the second biomolecule sequence can be an RNA sequence. For example, a positive sample set $\{(RNA_i, pro_i), i=1, \ldots, K\}$ may also be obtained, and the positive sample set includes K positive RNA-protein pairs.

In step S920, a trained network model is used to vectorize the first biomolecule sequence in the positive sample to obtain the biomolecule vector of the first biomolecule sequence.

In an exemplary implementation, a trained network model can be used to perform vectorization processing on the first biomolecule sequence in the positive sample. Among them, the network model may be a BERT coder or a neural network. For example, the neural network may be an Embedding network, or may be a recurrent neural network, or may be a network structure composed of an Embedding network and a recurrent neural network. In other examples, the first biomolecular sequence in the positive sample can also be encoded by methods such as One-Hot encoding.

For example, when the first biomolecule sequence in the positive RNA-protein pair is an RNA sequence, the biomolecule vector corresponding to the RNA sequence obtained through the trained network model is a third RNA vector. For example, when more than one RNA sequence is vectorized, each RNA sequence can be converted into N base k-mer subsequences, and each base k-mer subsequence can be vectorized through the trained network model to obtain the third RNA vector. For example, each base k-mer subsequence can be encoded to obtain first vectors of N base k-mer subsequences, and the first vectors of N bases k-mer subsequences can be input into a trained pre-training model, N base k-mer vectors are output, and finally the third RNA vector is obtained according to the N base k-mer vectors. Among them, the pre-training model may be a BERT coder. For another example, each base k-mer subsequence in the RNA sequence can be encoded to obtain the first vectors of N base k-mer subsequences. The first mapping matrix can be used to perform operation on the first vectors of the N base k-mer subsequences to obtain the second vectors of the N base k-mer subsequences, and according to the second vectors of the N base k-mer subsequences to obtain the third RNA vector. For another example, each base k-mer subsequence can be encoded to obtain the first vectors of N base k-mer subsequences. The first mapping matrix can be used to perform operation on the first vectors of N base k-mer subsequences to obtain the second vectors of the N base k-mer subsequences, and the second vectors of the N base-k-mer subsequences are input into a trained BERT encoder, N base k-mer vectors are output, and finally the third RNA vector is obtained according to the N base k-mer vectors.

When the first biomolecule sequence in the positive RNA-protein pair is a protein sequence, the biomolecule vector corresponding to the protein sequence obtained through the trained network model is a third protein vector. Similarly, when more than one protein sequences are vectorized, each protein sequence can also be converted into M amino acid k-mer subsequences, and each amino acid k-mer subsequence can be vectorized to obtain the third protein vector. For example, each amino acid k-mer subsequence in the protein sequence can be encoded to obtain first vectors of M amino acid k-mer subsequences. Then, the first vectors of M amino acid k-mer subsequences can be input into a trained pre-training model, the M amino acid k-mer vectors can be output, and the third protein vector can be obtained according to the M amino acid k-mer vectors. Among them, the pre-training model may be a BERT coder. For another example, each amino acid k-mer subsequence in the protein sequence may be encoded to obtain first vectors of M amino acid k-mer subsequences. A second mapping matrix can be used to perform operation on the first vectors of M amino acid k-mer-subsequences to obtain the second vectors of M amino acid k-mer subsequences, and the third protein vector is obtained according to the second vectors of M amino acid k-mer subsequences. For another example, each amino acid k-mer subsequence can be encoded to obtain first vectors of M amino acid k-mer subsequences, and the first vectors of M amino acid k-mer subsequences can be performed operation using a second mapping matrix to obtain the second vectors of M the amino acid k-mer subsequences, and the second vectors of the M amino acid k-mer subsequences are input into the trained BERT encoder, the M amino acid k-mer vectors are output, and finally the third protein vector is obtained according to the M amino acid k-mer vectors.

In step S930, the similarity between the biomolecule vector of the first biomolecule sequence and the biomolecule vector of any homologous biomolecule sequence except for the first biomolecule sequence is calculated.

For example, for the i-th positive RNA-protein pair $(RNA_i, pro_i)$ in the positive sample set $\{(RNA_i, pro_i), i=1, \ldots, K\}$, the first biomolecule sequence is $RNA_i$, the second biomolecule sequence is $pro_i$, and any homologous biomolecule sequence except for $RNA_i$ in the positive sample set is $RNA_j (j=1, \ldots, K, j \neq i)$. The similarity between $RNA_i$ and any RNA sequence except for $RNA_i$ in the positive sample set can be calculated. For example, the similarity between the third RNA vector of $RNA_i$ and the third RNA vector of $RNA_j$ can be calculated, that is, according to:

$$S(Vr_j, Vr_i) = \frac{\langle Vr_j, Vr_i \rangle}{\sqrt{\langle Vr_j, Vr_j \rangle} \sqrt{\langle Vr_i, Vr_i \rangle}}, \quad (26)$$

the similarity between the two third RNA vectors $Vr_i$ and $Vr_j$ is calculated; Among them, $Vr_i$ represents the third RNA vector of the RNA sequence $r_i$, and $Vr_j$ represents the third RNA vector of the RNA sequence $r_j$. $\sqrt{\langle Vr_j, Vr_j \rangle}$ represents the modulus length of $Vr_j$, $\sqrt{\langle Vr_i, Vr_i \rangle}$ represents the modulus length of $Vr_i$, and $S(Vr_j, Vr_i)$ represents the cosine value of the angle between $Vr_i$ and $Vr_j$, the closer the cosine value is to 1, the closer the angle is to 0 degrees, that is, the higher the similarity of $Vr_i$ and $Vr_j$. In addition to calculating the cosine distance of two third RNA vectors according to formula (26), the Euclidean distance, the Mahalanobis distance, etc., of two third RNA vectors can also be calculated to obtain the similarity of two RNA sequences. In other examples, the similarity between two RNA sequences can also be determined by calculating the distance between the two RNA sequences, which is not specifically limited in the present disclosure. $pro_i$ can also be taken as the first biomolecule sequence and $RNA_i$ as the second biomolecule sequence, any homologous biomolecule sequence in the positive sample set except for $pro_i$ is $pro_j (j=1, \ldots, K, j \neq i)$. The similarity between $pro_i$ and any protein sequence except for $pro_i$ in the positive sample set can be calculated. For example, the similarity between the third protein vector of $pro_i$ and the third protein vector of $pro_j$ can be calculated, that is, according to:

$$S(Vp_j, Vp_i) = \frac{\langle Vp_j, Vp_i \rangle}{\sqrt{\langle Vp_j, Vp_j \rangle} \sqrt{\langle Vp_i, Vp_i \rangle}}, \quad (27)$$

the similarity between the two third protein vectors $Vp_i$ and $Vp_j$ is calculated; Among them, $Vp_i$ represents the third protein vector of the protein sequence $p_i$, $Vp_j$ represents the third protein vector of the protein sequence $p_j$, $\sqrt{\langle Vp_j, Vp_j \rangle}$ represents the modulus length of $Vp_j$, $\sqrt{\langle Vp_i, Vp_i \rangle}$ represents the modulus length of $Vp_i$, and $S(Vp_j, Vp_i)$ represents the cosine value of the angle between $Vp_j$ and $Vp_i$, the closer the cosine value is to 1, the closer the angle is to 0 degrees, that is, the higher the similarity between $Vp_i$ and $Vp_j$ is. In addition to calculating the cosine distance of two third protein vectors according to formula (27), the Euclidean distance, the Mahalanobis distance, etc., of two third protein vectors can also be calculated to obtain the similarity of two protein sequences. In other examples, the similarity between two protein sequences can also be determined by calculating the distance between the two protein sequences, which is not specifically limited in the present disclosure.

In step S940, a homologous target biomolecule sequence similar to the first biomolecule sequence is determined according to the similarity.

Corresponding to step S930, after calculating the similarity between $RNA_i$ and $RNA_j$, the target RNA sequence similar to the target RNA sequence can be determined according to the similarity. For example, other RNA sequences in the positive sample set except for $RNA_i$ can be sorted in descending order according to the similarity, and a certain number (for example, 20) of the RNA sequences counted backwards are selected as the target RNA sequences. Other RNA sequences in the positive sample set except for $RNA_i$ can also be sort in ascending order according to the similarity, and a certain number (for example, 20) of RNA sequences counted forwards as the target RNA sequences. A similarity threshold can also be set in advance, and an RNA sequence smaller than the similarity threshold is taken as the target RNA sequence. This disclosure does not limit the specific value of the similarity threshold. It should be noted that the RNA sequence with a small similarity with $RNA_i$ is selected as the target RNA sequence, because it can be considered that the probability of presence of interaction between the RNA sequence with small similarity with $RNA_i$ and $pro_i$ in the positive RNA-protein pair is smaller, that is, the RNA-protein pair composed of the RNA sequence with small similarity with $RNA_i$ and $pro_i$ is the target negative sample.

In other examples, an RNA sequence with a similarity satisfying a preset condition in the positive sample set can be taken as a candidate RNA sequence. For example, a third negative sample set can be obtained from one or more candidate RNA sequences satisfying the preset condition, and then a target negative sample can be determined according to the third negative sample set. For example, a third sampling probability can be determined according to the similarity between the candidate RNA sequence and $RNA_i$, and the candidate RNA sequence that can replace $RNA_i$ is selected from the third negative sample set according to the third sampling probability, and the candidate RNA sequence and $pro_i$ constitute the target negative RNA-protein pair.

Specifically, an empty set $T=\{ \}$ can be given in advance. All candidate RNA sequences $(RNA_j, s_j)$ can be put into the set T. If T is an empty set, it can indicate that no negative RNA-protein pair can be generated based on the i-th positive RNA-protein pair ($RNA_i$, $pro_i$). If T is not an empty set, a third sampling probability {$p_a$, a=1, . . . , |T|} can be determined according to the similarity between the candidate RNA sequence and $RNA_i$, that is, according to:

$$p_a = \frac{s_a}{\sum_{l=1}^{l=|T|} s_l}, \quad (28)$$

the third sampling probability $p_a$ is obtained; Among them, |T| represents the number of elements in the set T, the a-th element is ($RNA_j$, $s_j$), $s_a$ represents the similarity between a certain candidate RNA sequence and $RNA_i$, and $\sum_{l=1}^{l=|T|} s_l$ represents the sum of similarity between all candidate RNA sequences and $RNA_i$. Then, L candidate RNA sequences can be sampled from the set T according to the third sampling probability $p_a$. The present disclosure does not limit the specific value of L, that is, any number of candidate RNA sequences can be sampled according to actual needs, and any number of candidate RNA sequences and $pro_i$ constitute a corresponding target negative RNA-protein pair. Similarly, after calculating the similarity between $pro_i$ and $pro_j$, the target protein sequence similar to $pro_i$ can be determined according to the similarity. For example, other protein sequences expect for $pro_i$ in the positive sample set can be sorted in descending order according to the similarity, and a certain number of protein sequences (for example, 20) counted backwards can be selected as the target protein sequence. Other protein sequences expect for $pro_i$ in the positive sample set can also be sorted in ascending order according to the similarity, and a certain number of protein sequences (for example, 20) counted forwards as the target protein sequence. Similarly, a similarity threshold can also be set in advance, and protein sequences smaller than the similarity threshold can be taken as target protein sequences. This disclosure does not limit the specific value of the similarity threshold.

In other examples, protein sequences with similarity satisfying a preset condition in the positive sample set can be taken as candidate protein sequences. For example, a fourth negative sample set may be obtained from one or more candidate protein sequences satisfying the preset condition, and then a target negative sample is determined according to the fourth negative sample set. For example, a fourth sampling probability can be determined according to the similarity between the candidate protein sequence and $pro_i$, and a candidate protein sequence that can replace $pro_i$ can be selected from the fourth negative sample set according to the fourth sampling probability, and the target negative RNA-protein pair can be composed of the candidate protein sequence and $RNA_i$.

Specifically, an empty set T={ } can be given in advance. All candidate protein sequences ($pro_j$, $S_j$) can be put into the set T. If T is an empty set, it can indicate that no negative RNA-protein pair can be generated based on the i-th positive RNA-protein pair ($RNA_i$, $pro_i$). If T is not an empty set, the fourth sampling probability {$p_b$, b=1, . . . , |T|} can be determined according to the similarity between the candidate protein sequence and $pro_i$, that is, according to:

$$p_b = \frac{s_b}{\sum_{l=1}^{l=|T|} s_l}, \quad (29)$$

the fourth sampling probability $p_b$ is obtained; where, |T| represents the number of elements in the set T, the b-th element is ($RNA_j$, $s_j$), $s_b$ represents the similarity between a certain candidate protein sequence and $pro_i$, and $\sum_{l=1}^{l=|T|} S_l$ represents the sum of similarity between all candidate protein sequences and $pro_i$. Then, L candidate protein sequences can be sampled from the set T according to the fourth sampling probability $p_b$. The present disclosure does not limit the specific value of L, that is, any number of candidate protein sequences can be sampled according to actual needs, and a corresponding target negative RNA-protein pair can be composed of any number of candidate protein sequences and $RNA_i$.

In step S950, a negative sample corresponding to the positive sample is obtained from the homologous target homologous biomolecule sequence and the second biomolecule sequence in the positive sample.

When the homologous target biomolecule sequence is the target RNA sequence, the first biomolecule sequence in the positive sample is an RNA sequence, and the second biomolecule sequence in the positive sample is a protein sequence, and the target RNA sequence can be used to replace the RNA sequence in the positive sample, the RNA-protein pair composed of the target RNA sequence and the protein sequence in the positive sample can be taken as the negative sample corresponding to the positive sample.

Similarly, when the homologous target biomolecule sequence is the target protein sequence, the first biomolecule sequence in the positive sample is a protein sequence, and the second biomolecule sequence in the positive sample is an RNA sequence. The target protein sequence can be used to replace the protein sequence in the positive sample, and the RNA-protein pair composed of the target protein sequence and the RNA sequence in the positive sample can also be taken as a negative sample corresponding to the positive sample.

In the method for generating the negative sample provided by the exemplary embodiment of the present disclosure, by obtaining a positive sample, the positive sample being composed of two biomolecular sequences, a trained network model is used to vectorize the first biomolecule sequence in the positive sample, so as to obtain the biomolecule vector of the first biomolecule sequence; the similarity between the biomolecule vector of the first biomolecule sequence and the biomolecule vector of any homologous biomolecule sequence except for the first biomolecule sequence is calculated; a homologous target biomolecule sequence similar to the first biomolecule sequence is determined according to the similarity; and a negative sample corresponding to the positive sample is obtained from the homologous target homologous biomolecule sequence and the second biomolecule sequence in the positive sample. On the one hand, the biomolecular vectors learned by the trained network model can accurately reflect the similarity between the homologous biomolecular sequences. When generating negative samples based on the biomolecular vectors, it can ensure that the negative samples are similar to the known positive samples, improving the quality of negative samples; on the other hand, when using high-quality negative samples to train the prediction model for RNA-protein interaction, the prediction model for RNA-protein interaction can learn more useful classification information, thus improving the accuracy of RNA-protein interaction prediction.

Figure 10:
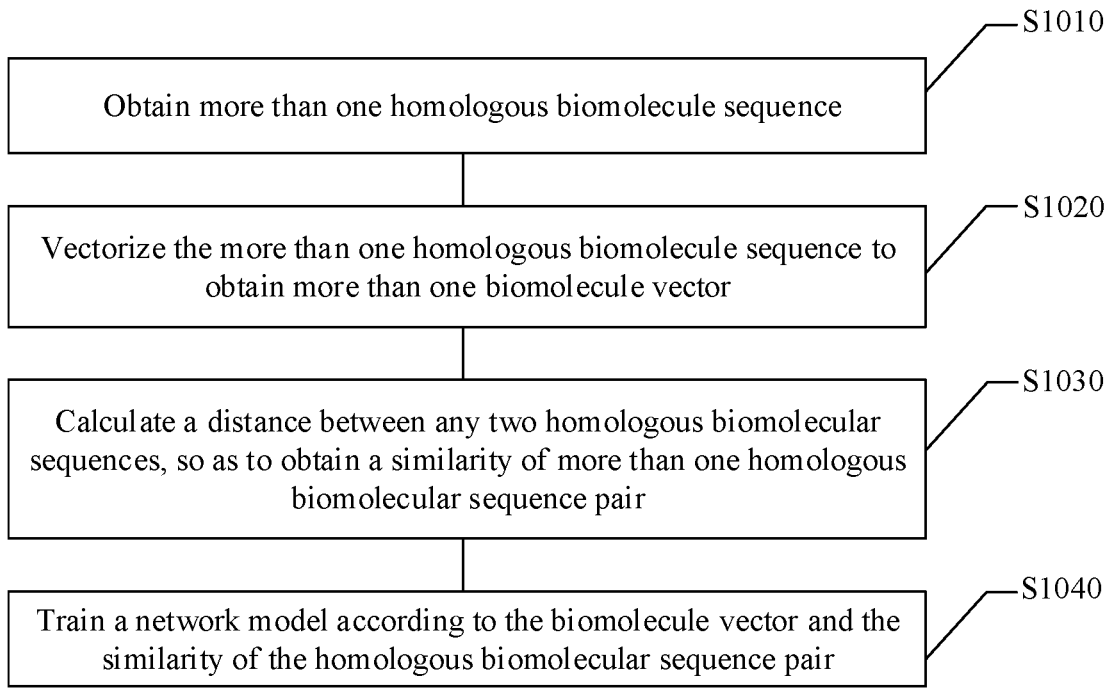
FIG. 10 schematically shows a flow chart of training a network model according to some embodiments of the present disclosure.

In an example implementation, as shown in FIG. 10, the network model may be trained according to step S1010 to step S1040.

In step S1010, more than one homologous biomolecule sequence is obtained.

Taking RNA and protein as an example, RNA and protein belong to different classes of biomolecules. Therefore, the homologous biomolecule can be RNA or protein. Correspondingly, more than one RNA sequence can be obtained, and the network model can be trained using more than one RNA sequence, so that the network model can continuously learn RNA-RNA similarity information during the training process. It is also possible to obtain more than one protein sequences and use more than one protein sequence to train the network model, so that the network model can continuously learn protein-protein similarity information during the training process.

In step S1020, more than one homologous biomolecule sequence is vectorized to obtain more than one biomolecule vector.

The homologous biomolecule sequence may be an RNA sequence, and correspondingly, the biomolecule vector may be a fourth RNA vector. For example, when more than one RNA sequence can be vectorized, each RNA sequence can be converted into N base k-mer subsequences, and each base k-mer subsequence can be vectorized to obtain the fourth RNA vector. For example, each base k-mer subsequence can be encoded to obtain the first vectors of N base k-mer subsequences, and the first vectors of N bases k-mer subsequences can be input into the pre-training model, N base k-mer vectors are output, and finally the fourth RNA vector is obtained according to the N base k-mer vectors. For another example, each base k-mer subsequence in the RNA sequence can be encoded to obtain the first vectors of N base k-mer subsequences. A first mapping matrix can be used to perform operation on the first vectors of the N base k-mer subsequences to obtain the second vectors of the N base k-mer subsequences, and according to the second vectors of the N base k-mer subsequences the fourth RNA vector is obtained. For another example, each base k-mer subsequence can be encoded to obtain the first vectors of N base k-mer subsequences, and the first vectors of N base k-mer subsequences can be performed operation using the first mapping matrix to obtain the second vectors of the N base k-mer subsequences, and the second vectors of the N base k-mer subsequences are input into the pre-training model, the N base k-mer vectors are output, and finally the fourth RNA vector is obtained according to the N base k-mer vectors. The RNA sequence can also be vectorized according to step S220 in the method for training a vector model of the present disclosure, which will not be repeated here.

The homologous biomolecule sequence can also be a protein sequence, and correspondingly, the biomolecule vector is the fourth protein vector. Similarly, when more than one protein sequence can be vectorized, each protein sequence can be converted into M amino acid k-mer subsequences, and each amino acid k-mer subsequence can be vectorized to obtain the fourth protein vector. For example, each amino acid k-mer subsequence in the protein sequence can be encoded to obtain the first vectors of M amino acid k-mer subsequences. Then, the first vectors of M amino acid k-mer subsequences can be input into the pre-training model, the M amino acid k-mer vectors can be output, and the fourth protein vector can be obtained according to the M amino acid k-mer vectors. For another example, each amino acid k-mer subsequence in the protein sequence may be encoded to obtain the first vectors of M amino acid k-mer subsequences. A second mapping matrix can be used to perform operation on the first vectors of M amino acid k-mer subsequences to obtain the second vectors of M amino acid k-mer subsequences, and the first protein vector is obtained according to the second vectors of M amino acid k-mer subsequences. For another example, each amino acid k-mer subsequence can be encoded to obtain the first vectors of M amino acid k-mer subsequences, and the first vectors of M amino acid k-mer subsequences can be performed operation using the second mapping matrix to obtain the second vectors of the M amino acid k-mer subsequences, and the second vectors of the M amino acid k-mer subsequence are input into the pre-training model, the M amino acid k-mer vectors are output, and finally the fourth protein vector is obtained according to the M amino acid k-mer vectors. The protein sequence can also be vectorized according to step S230 in the method for training a vector model of the present disclosure, which will not be repeated here.

In step S1030, the distance between any two homologous biomolecular sequences is calculated to obtain the similarity of more than one homologous biomolecular sequence pair.

When the homologous biomolecule sequence is an RNA sequence, the edit distance between any two RNA sequences can be calculated, and the sequence distance between any two RNA sequences can be obtained according to the edit distance. Finally, the similarity of more than one RNA-RNA pair can be obtained according to the sequence distance of any two RNA sequences. The vector space model can also be used to calculate the distance between any two RNA sequences to obtain the similarity of more than one RNA-RNA pair. For example, each RNA sequence can be converted into an RNA vector, and the distance between any two RNA vectors can be calculated to obtain the similarity of more than one RNA-RNA pair. The specific details of determining the similarity of the RNA-RNA pair are similar to step S250 in the method for training a vector model of the present disclosure, and will not be repeated here.

When the homologous biomolecular sequence is a protein sequence, the vector space model can be used to calculate the distance between any two protein sequences to obtain the similarity of more than one protein-protein pair. Specifically, more than one protein sequence can be mapped to the vector space to obtain more than one protein vector, and the similarity of more than one protein-protein pair can be obtained by calculating the distance between any two protein vectors. The similarity of more than one protein-protein pair can also be obtained by calculating the sequence distance between any two protein sequences. For example, the edit distance between any two protein sequences can be calculated, and the sequence distance between any two protein sequences can be obtained according to the edit distance. Finally, the similarity of more than one protein-protein pair can be obtained according to the sequence distance of any two protein sequences. The specific details of determining the similarity of protein-protein pairs are similar to step S260 in the method for training a vector model of the present disclosure, and will not be repeated here.

In step S1040, the network model is trained according to the similarity between the biomolecule vector and the similarity of the homologous biomolecular sequence pair.

In an example implementation, the network model may be trained according to the fourth RNA vector and the similarity of the RNA-RNA pair. For example, the objective function can be constructed according to the fourth RNA vector and the similarity of the RNA-RNA pair. Based on the objective function, the model parameters of the network model can be iteratively updated using the stochastic gradient descent algorithm. When an iterative termination condition is satisfied, the training of the network model is completed.

Specifically, the calculated similarity of the RNA-RNA pair can be taken as a label value, and after obtaining more than one fourth RNA vector through the network model, the similarity of any two fourth RNA vectors can be calculated, and the loss value is calculated according to the similarity and the corresponding label value, that is, the constructed objective function can be:

$$L_1 = \Sigma_{i,j} \left\| \frac{\langle V_i^R, V_j^R \rangle}{|V_i^R||V_j^R|} - simR(r_i, r_j) \right\|^2. \quad (30)$$

Among them, $r_i$ represents the i-th RNA sequence, $r_j$ represents the j-th RNA sequence, $V_i^R$ represents the i-th fourth RNA vector, and $V_j^R$ represents the j-th fourth RNA vector. The model parameters can be updated using the stochastic gradient descent algorithm. According to the principle of backpropagation, the objective function $L_1$ is continuously calculated, and all model parameters of the network model are simultaneously updated according to the calculated loss value. When the objective function $L_1$ converges to the minimum value, the training of all model parameters is completed. By training the network model continuously based on $L_1$, the RNA vector learned by the network model can more accurately reflect the similarity between RNA sequences.

In some embodiments, the network model can be trained according to the fourth protein vector and the similarity of protein-protein pair. For example, the objective function can be constructed according to the fourth protein vector and the similarity of the protein-protein pair. Based on the objective function, the model parameters of the network model can be iteratively updated using the stochastic gradient descent algorithm. When the iteration termination condition is satisfied, the training of the network model is completed.

Specifically, the calculated similarity of protein-protein pair can be taken as the label value. After obtaining more than one fourth protein vector through the network model, the similarity of any two first protein vectors can be calculated, and the loss value is calculated according to the similarity and the corresponding label value, that is, the constructed objective function can be:

$$L_2 = \Sigma_{i,j} \left\| \frac{\langle V_i^P, V_j^P \rangle}{|V_i^P||V_j^P|} - simP(p_i, p_j) \right\|^2. \quad (31)$$

Among them, $p_i$ represents the i-th protein sequence, $p_j$ represents the j-th protein sequence, $V_i^P$ represents the i-th fourth protein vector, and $V_j^P$ represents the j-th fourth protein vector. Similarly, the model parameters can be updated using the stochastic gradient descent algorithm. According to the principle of backpropagation, the objective function $L_2$ is continuously calculated, and all model parameters of the network model are simultaneously updated according to the calculated loss value. When the objective function $L_2$ converges to the minimum value, the training of all model parameters is completed. By training the network model continuously based on $L_2$, the protein vector learned by the network model can more accurately reflect the similarity between protein sequences.

It should be noted that the method for training a vector model and the method for generating a negative sample of the present disclosure can be applied to analyze the interaction between the first biomolecule and the second biomolecule, and the biomolecule can be protein, nucleic acid (RNA and DNA), fats and sugars etc. For example, it may be the interaction between protein and protein, the interaction between protein-nucleic acid/lipid/sugar, the interaction between nucleic acid-nucleic acid, etc. The present disclosure is not limited to this, and RNA and protein are only taken as examples in the present disclosure.

It should be noted that, although the steps of the methods in present disclosure are described in a particular order in the drawings, it does not require or imply that the steps must be performed in that particular order, or that all illustrated steps must be performed to achieve the desired result. Additionally or alternatively, certain steps may be omitted, more than one step may be combined into one step for execution, and/or one step may be decomposed into more than one step for execution, etc.

Figure 11:
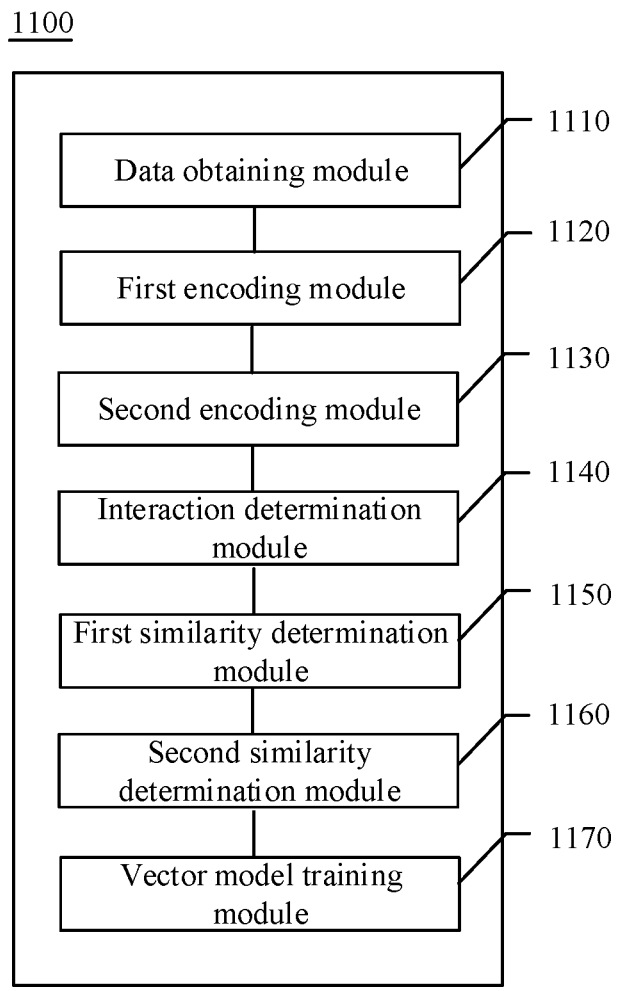
FIG. 11 schematically shows a block diagram of an apparatus for training a vector model according to some embodiments of the present disclosure.

Further, in the example embodiments, there is further provided an apparatus for training a vector model. The apparatus can be applied to a server or terminal equipment. As shown in FIG. 11, the apparatus for training a vector model 1100 may include a data obtaining module 1110, a first encoding module 1120, a second encoding module 1130, an interaction determination module 1140, a first similarity determination module 1150, a second similarity determination module 1160 and a vector model training module 1170, where:

the data obtaining module 1110 is configured to obtain more than one RNA sequence and more than one protein sequence;

the first coding module 1120 is configured to vectorize the more than one RNA sequence to obtain more than one first RNA vector;

the second coding module 1130 is configured to vectorize the more than one protein sequence to obtain more than one first protein vector;

the interaction determination module 1140 is configured to determine an interaction between the RNA sequence and the protein sequence according to the first RNA vector and the first protein vector;

the first similarity determination module 1150 is configured to calculate a distance between any two RNA sequences to obtain a similarity of more than one RNA-RNA pair;

the second similarity determination module 1160 is configured to calculate a distance between any two protein sequences to obtain a similarity of more than one protein-protein pair;

the vector model training module 1170 is configured to train the vector model according to the interaction between the RNA sequence and the protein sequence, the similarity of the RNA-RNA pair and the similarity of the protein-protein pair.

In an optional embodiment, the first coding module 1120 includes:

a first sequence conversion module, configured to convert each RNA sequence into N base k-mer subsequences;

a first sequence encoding module, configured to vectorize each base k-mer subsequence to obtain a first RNA vector.

In an optional embodiment, the first sequence encoding module includes:
- a first sequence encoding unit, configured to encode each base k-mer subsequence to obtain first vectors of N base k-mer subsequences;
- a first vector determination unit, configured to input the first vectors of the N base k-mer subsequences into a recurrent neural network, output N base k-mer vectors, and obtain the first RNA vector according to the N base k-mer vectors.

In an optional embodiment, the second encoding module 1130 includes:
- a second sequence conversion module, configured to convert each protein sequence into M amino acid k-mer subsequences;
- a second sequence encoding module, configured to vectorize each amino acid k-mer subsequence to obtain the first protein vector.

In an optional embodiment, the second sequence encoding module includes:
- a second sequence coding unit, configured to encode each amino acid k-mer subsequence to obtain the first vectors of M amino acid k-mer subsequences;
- a second vector determination unit, configured to input the first vectors of the M amino acid k-mer subsequences into a recurrent neural network, output M amino acid k-mer vectors, and obtain the first protein vector according to the M amino acid k-mer vectors.

In an optional embodiment, the interaction determination module 1140 includes:
according to:

$$p(1|(v^R, v^P)) = \frac{1}{1 + e^{(\theta \cdot (v^R, v^P))}},$$

a probability value of presence of the interaction between the RNA sequence and the protein sequence is calculated, and the interaction between the RNA sequence and the protein sequence is determined according to the probability value; where, $\theta$ is a model parameter, and $v^R$ is the first RNA vector, and $v^P$ is the first protein vector.

In an optional embodiment, the first similarity determination module 1150 includes:
- a sequence distance calculation unit, configured to calculate an edit distance between any two RNA sequences, and obtain a sequence distance between any two RNA sequences according to the edit distance;
- a first similarity determination unit, configured to obtain the similarity of more than one RNA-RNA pair according to the sequence distance between any two RNA sequences.

In an optional embodiment, the sequence distance calculation unit is configured to:
according to:

$$d(r_i, r_j) = \frac{lev(r_i, r_j)}{\max(len(r_i), len(r_j))},$$

obtain the distance of any two RNA sequences $r_i$, $r_j$; where, $lev(r_i, r_j)$ represents the edit distance between the RNA sequencer; and the RNA sequence $r_j$, $len(r_i)$ represents the length of the RNA sequence $r_i$, and $len(r_j)$ represents the length of the RNA sequence $r_j$.

In an optional embodiment, the first similarity determining unit configured to: according to:

$$simR(r_i, r_j) = 1 - d(r_i, r_j),$$

obtain more than one RNA-RNA pair; where, $d(r_i, r_j)$ represents the sequence distance of any two RNA sequences $r_i$, $f_j$.

In an optional embodiment, the second similarity determination module 1 160 includes:
- a protein generating unit, configured to map more than one protein sequence into a vector space to obtain more than one protein vector;
- a second similarity determination unit, configured to calculate the distance between any two protein vectors to obtain the similarity of more than one protein-protein pair.

In an optional embodiment, the vector model training module 1170 includes:
- an objective function construction unit, configured to construct an objective function according to the interaction between the RNA sequence and the protein sequence, the similarity of the RNA-RNA pair and the similarity of the protein-protein pair;
- a vector model training unit, configured to update the model parameters of the vector model iteratively using a stochastic gradient descent algorithm based on the objective function, and complete the training of the vector model when an iteration termination condition is satisfied.

In an optional embodiment, the objective function is:

$$L = -\alpha \Sigma_{i=1}^{K} \log p(1|v_i^R, v_i^P) - \beta \Sigma_{i,j} \left\| \frac{\langle v_i^R, v_j^R \rangle}{\|v_i^R\| \|v_j^R\|} - simR(r_i, r_j) \right\|^2 - \gamma \Sigma_{i,j} \left\| \frac{\langle v_i^P, v_j^P \rangle}{\|v_i^P\| \|v_j^P\|} - simP(p_i, p_j) \right\|^2$$

where, $r_i$ represents the i-th RNA sequence, $r_j$ represents the j-th RNA sequence, $p_i$ represents the i-th protein sequence, $p_j$ represents the j-th protein sequence, $v_i^R$ represents the i-th first RNA vector, $v_i^P$ represents the i-th first protein vector, $\alpha$, $\beta$, $\gamma$ are model hyperparameters, and K is the sequence number of RNA sequences and protein sequences.

The specific details of each module in the above-mentioned apparatus of training a vector model have been described in detail in the corresponding method for training a vector model, so details will not be repeated here.

Figure 12:
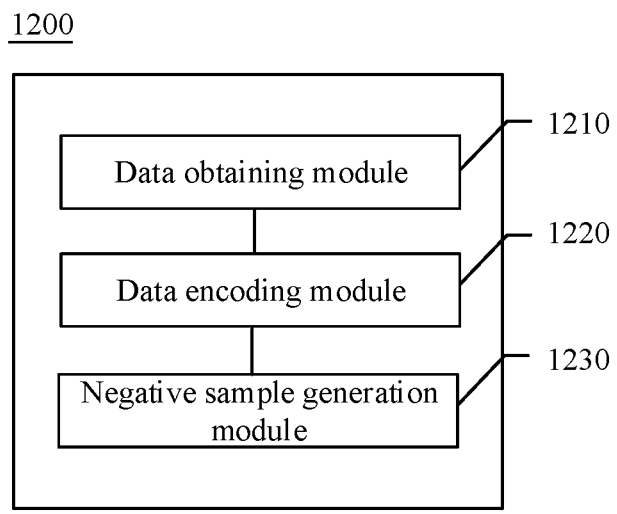
FIG. 12 schematically shows a block diagram of an apparatus for generating a negative sample according to some embodiments of the present disclosure.

Further, in the example embodiment, there is provided an apparatus for generating a negative sample. The apparatus can be applied to a server or terminal equipment. As shown in FIG. 12, the apparatus for generating a negative sample 1200 may include a data obtaining module 1210, a data encoding module 1220, and a negative sample generation module 1230, where:
- the data obtaining module 1210 is configured to obtain a positive RNA-protein pairs;
- the data encoding module 1220 is configured to vectorize the target RNA sequence and the target protein sequence in the positive RNA-protein pair through a trained vector model to obtain the corresponding second RNA vector and second protein vector;

the negative sample generation module 1230 is configured to obtain the target negative RNA-protein pair corresponding to the positive RNA-protein pair based on the second RNA vector and the second protein vector, the target negative RNA-protein pair being used to train a prediction model for RNA-protein interaction.

In an optional embodiment, the negative sample generation module 1230 includes:
- a first similarity calculation module, configured to calculate the similarity between the target RNA sequence and any RNA sequence except for the target RNA sequence;
- a first candidate sequence generation module, configured to screen any RNA sequence except for the target RNA sequence according to the similarity to obtain a candidate RNA sequence;
- a first relationship score determination module, configured to calculate the relationship score between the candidate RNA sequence and the target protein sequence according to the second RNA vector of the candidate RNA sequence and the second protein vector of the target protein sequence;
- a first negative example generation module, configured to determine the target negative RNA-protein pair according to the relationship score between the candidate RNA sequence and the target protein sequence.

In an optional embodiment, the first relationship score determination module includes:
- a first relationship score determining unit, configured to calculate the relationship score between the candidate RNA sequence and the target protein sequence based on the model parameters of the vector model and according to the second RNA vector of the candidate RNA sequence and the second protein vector of the target protein sequence.

Among them, the model parameters are obtained by training the vector model.

In an optional embodiment, the first relationship score determining unit is configured to:
according to:

$$x_j = \theta \cdot \langle dr_j, dp_i \rangle,$$

calculate he relationship score between the candidate RNA sequence and the target protein sequence; where, $dr_j$ is the second RNA vector of the candidate RNA sequence, $dp_i$ is the second protein vector of the target protein sequence, and $\theta$ is a model parameter in the vector model having completed the training, $\langle dr_j, dp_i \rangle$ representing the dot product operation on $dr_j$ and $dp_i$.

In an optional embodiment, the first negative example generation module includes:
- a first negative sample set determination unit, configured to obtain a first negative sample set from the candidate RNA sequence when the relationship score between the candidate RNA sequence and the target protein sequence satisfies a preset condition;
- a first negative example generating unit, configured to determine the target negative RNA-protein pair according to the first negative sample set.

In an optional embodiment, the negative sample generation module 1230 includes:
- a second similarity calculation module, configured to calculate the similarity between the target protein sequence and any protein sequence except for the target protein sequence;
- a second candidate sequence generation module, configured to screen any protein sequence except for the target protein sequence according to the similarity to obtain a candidate protein sequence;
- a second relationship score determination module, configured to calculate the relationship score between the candidate protein sequence and the target RNA sequence according to the second protein vector of the candidate protein sequence and the second RNA vector of the target RNA sequence;
- a second negative example generation module, configured to determine the target negative RNA-protein pair according to the relationship score between the candidate protein sequence and the target RNA sequence.

In an optional embodiment, the second negative example generation module includes:
- a second negative sample set determination unit, configured to obtain the second negative sample set from the candidate protein sequence when the relationship score between the candidate protein sequence and the target RNA sequence satisfies a preset condition;
- a second negative example generating unit, configured to determine the target negative RNA-protein pair according to the second negative sample set.

In an optional embodiment, the negative sample generation device 1200 further includes:
- a training data obtaining module, configured to obtain the training data set, the training data set being composed of more than one RNA-protein pair;
- a prediction value output module, configured to determine the interaction between the RNA sequence and the protein sequence in the training data set, the similarity of the RNA-RNA pair and the similarity of the protein-protein pair through the vector model;
- an objective function building module, configured to construct an objective function according to the interaction between the RNA sequence and the protein sequence, the similarity of the RNA-RNA pair and the similarity of the protein-protein pair;
- a model parameter adjustment module, configured to iteratively update the model parameters of the vector model using a stochastic gradient descent algorithm based on the objective function, and complete the training of the vector model when an iteration termination condition is satisfied.

The details of the above-mentioned modules of the apparatus for generating a negative sample have been described in detail in the corresponding method for generating a negative sample, so details will not be repeated here.

Figure 13:
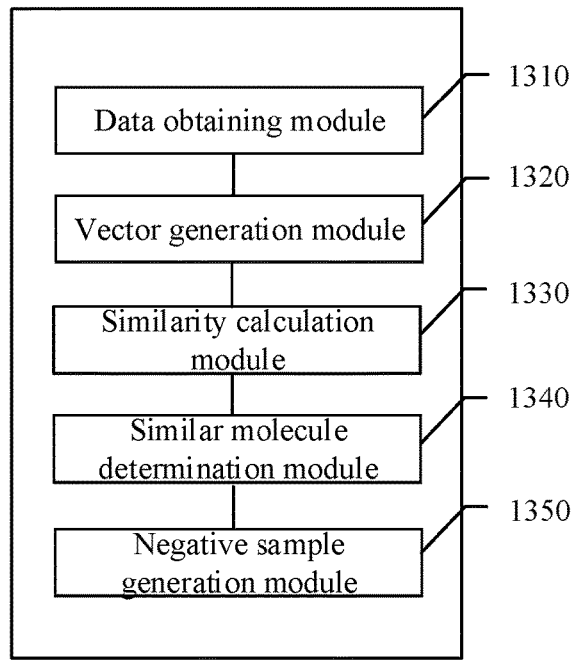
FIG. 13 schematically shows a block diagram of an apparatus for generating a negative sample according to another embodiment of the present disclosure.

Further, in the example embodiment, there is provided an apparatus for generating a negative sample. The apparatus can be applied to a server or terminal equipment. As shown in FIG. 13, the apparatus for generating a negative sample 1300 may include a data obtaining module 1310, a vector generation module 1320, a similarity calculation module 1330, a similar molecule determination module 1340, and a negative sample generation module 1350, where:

the data acquisition module 1310 is configured to obtain a positive sample, the positive sample being composed of two biomolecular sequences;

the vector generating module 1320 is configured to vectorize the first biomolecule sequence in the positive sample through a trained network model, and obtain the biomolecule vector of the first biomolecule sequence;

the similarity calculation module 1330 is configured to calculate the similarity between the biomolecule vector of the first biomolecule sequence and the biomolecule vector of any homologous biomolecule sequence except for the first biomolecule sequence;

the similar molecule determination module 1340 is configured to determine the homologous target biomolecule sequence similar to the first biomolecule sequence according to the similarity;

the negative sample generating module 1350 is configured to obtain a negative sample corresponding to the positive sample from the homologous target biomolecule sequence and the second biomolecule sequence in the positive sample.

In an optional embodiment, the first biomolecule sequence is an RNA sequence, and the biomolecule vector is a third RNA vector; the vector generation module 1320 includes:

a first sequence conversion module, configured to convert each RNA sequence into N base k-mer subsequences;

a first sequence encoding module, configured to vectorize each base k-mer subsequence through the trained network model to obtain the third RNA vector.

In an optional embodiment, the first sequence encoding module includes:

a first sequence encoding unit, configured to encode each base k-mer subsequence to obtain the first vectors of N base k-mer subsequences;

a first vector determination unit, configured to input the first vectors of the N base k-mer subsequences into the trained pre-training model, output the N base k-mer vectors, and obtain the third RNA vector according to the N bases k-mer vectors.

In an optional embodiment, the similarity calculation module 1330 is configured to:

according to:

$$S(Vr_j, Vr_i) = \frac{\langle Vr_j, Vr_i \rangle}{\sqrt{\langle Vr_j, Vr_j \rangle} \sqrt{\langle Vr_i, Vr_i \rangle}},$$

calculate the similarity between the two third RNA vectors $Vr_i$ and $Vr_j$; where, $Vr_i$ represents the third RNA vector of the RNA sequence $r_i$, and $Vr_j$ represents the third RNA vector of the RNA sequence $r_j$.

In an optional embodiment, the first biomolecule sequence is a protein sequence, and the biomolecule vector is a third protein vector; the vector generation module 1320 includes:

a second sequence conversion module, configured to convert each protein sequence into M amino acid k-mer subsequences;

a second sequence encoding module, configured to vectorize each amino acid k-mer subsequence through the trained network model to obtain the third protein vector.

In an optional embodiment, the second sequence encoding module includes:

a second sequence coding unit, configured to encode each amino acid k-mer subsequence to obtain the first vectors of N amino acid k-mer subsequences;

a second vector determination unit, configured to input the first vectors of the M amino acid k-mer subsequences into the trained pre-training model, output the M amino acid k-mer vectors, and obtain the third protein vector according to the M amino acid k-mer vectors.

In an optional embodiment, the negative sample generation device 1300 further includes a training module, and the training module includes:

a biomolecular sequence obtaining module, configured to obtain more than one homologous biomolecular sequences;

a biomolecular vector generation module, configured to vectorize the more than one homologous biomolecular sequence to obtain more than one biomolecular vector;

a sequence pair similarity determination module, configured to calculate the distance between any two homologous biomolecular sequences to obtain the similarity of more than one homologous biomolecular sequence pair;

a network model training module, configured to train the network model according to the biomolecule vector and the similarity of and the homologous biomolecule sequence pair.

In an optional embodiment, the homologous biomolecule sequence is an RNA sequence; the sequence pair similarity determination module includes:

a sequence distance calculation unit, configured to calculate the edit distance between any two RNA sequences, and obtain the sequence distance between any two RNA sequences according to the edit distance;

a first similarity determination unit, configured to obtain the similarity of more than one RNA-RNA pair according to the sequence distance between any two RNA sequences.

In an optional embodiment, the biomolecular vector is the fourth vector of RNA; the network model training module includes:

an objective function construction unit, configured to construct an objective function according to the similarity of the RNA-RNA pair and the fourth RNA vector;

a network model training unit, configured to iteratively update the model parameters of the network model using the stochastic gradient descent algorithm based on the objective function, and complete the training of the network model when the iteration termination condition is satisfied.

In an optional embodiment, the objective function is:

$$L_1 = \Sigma_{i,j} \left\| \frac{\langle V_i^R, V_j^R \rangle}{|V_i^R||V_j^R|} - simR(r_i, r_j) \right\|^2.$$

Among them, $r_i$ represents the i-th RNA sequence, $r_j$ represents the j-th RNA sequence, $V_i^R$ represents the i-th fourth RNA vector, and $V_j^R$ represents the j-th fourth RNA vector.

In an optional embodiment, the homologous biomolecular sequence is a protein sequence; the sequence pair similarity determination module includes:

a protein generation unit, configured to map more than one protein sequence into a vector space to obtain more than one protein vector;

a second similarity determination unit, configured to calculate the distance between any two protein vectors to obtain the similarity of more than one protein-protein pair.

In an optional embodiment, the biomolecular vector is the fourth protein vector; the network model training module includes:

an objective function construction unit, configured to construct an objective function according to the similarity of the protein-protein pair and the fourth protein vector;

a network model training unit, configured to iteratively update the model parameters of the network model using the stochastic gradient descent algorithm based on the objective function, and complete the training of the network model when the iteration termination condition is satisfied.

In an optional embodiment, the objective function is:

$$L_2 = \Sigma_{i,j} \left\| \frac{\langle V_i^P, V_j^P \rangle}{|V_i^P||V_j^P|} - simP(p_i, p_j) \right\|^2.$$

Among them, $p_i$ represents the i-th protein sequence, $p_j$ represents the j-th protein sequence, $V_i^P$ represents the i-th fourth protein vector, and $V_j^P$ represents the j-th fourth protein vector.

The details of the above-mentioned modules of the apparatus for generating a negative sample have been described in detail in the corresponding method for generating a negative sample, so details will not be repeated here.

Each module in the above-mentioned apparatus can be a general-purpose processor, including: a central processing unit, a network processor, etc.; it can also be a digital signal processor, an application-specific integrated circuit, a field programmable gate array or other programmable logic devices, discrete gates or transistors Logic devices, discrete hardware components. Each module may also be implemented by software, firmware, and other forms. Each processor in the above apparatus may be an independent processor, or may be integrated together.

Exemplary embodiments of the present disclosure further provide a computer-readable storage medium, storing with a program product capable of implementing the above-mentioned method in the description. In some possible embodiments, various aspects of the present disclosure can also be implemented in the form of a program product, which includes a program code. When the program product is run on an electronic device, the program code is used to enable the electronic device to perform the steps described in the above "exemplary method" section of the description according to various exemplary embodiments of the disclosure. The program product may take the form of a portable compact disk read-only memory (CD-ROM) and include a program code, and may run on an electronic device such as a personal computer. However, the program product of the present disclosure is not limited to this. In the context document, a readable storage medium may be any tangible medium containing or storing with a program, and the program may be used by or in combination with an instruction execution system, apparatus or device.

A program product may take the form of any combination of one or more readable medium. The readable medium may be a readable signal medium or a readable storage medium. The readable storage medium may be, for example, but not limited to, an electrical, magnetic, optical, electromagnetic, infrared, or semiconductor system, apparatus, or device, or any combination of them. More specific examples (non-exhaustive list) of readable storage medium include: electrical connections with one or more conductors, portable disks, hard disks, random access memory (RAM), read only memory (ROM), erasable programmable read-only memory (EPROM or flash memory), optical fiber, portable compact disk read-only memory (CD-ROM), optical storage device, magnetic storage device, or any suitable combination of the above.

A computer readable signal medium may include a data signal propagated in baseband or as part of a carrier wave, which carries readable program code. Such propagated data signals may take many forms, including but not limited to electromagnetic signals, optical signals, or any suitable combination of the above. A readable signal medium may also be any readable medium other than a readable storage medium that can transmit, propagate, or transport a program for use by or in conjunction with an instruction execution system, apparatus, or device.

Program code embodied on a readable medium may be transmitted using any appropriate medium, including but not limited to wireless, wireline, optical fiber cable, RF, etc., or any suitable combination of the above.

Program code for performing the operations of the present disclosure may be written in any combination of one or more programming languages, including object-oriented programming languages—such as Java, C++, etc., as well as conventional procedural programming Language—such as "C" or similar programming language. The program code may be executed entirely on the user's computing device, partly on the user's device, as a stand-alone software package, partly on the user's computing device and partly on a remote computing device, or entirely on the remote computing device or server. In cases involving a remote computing device, the remote computing device may be connected to the user computing device through any kind of network, including a local area network (LAN) or a wide area network (WAN), or may be connected to an external computing device (for example, be connected via the Internet using an Internet service provided business).

Exemplary embodiments of the present disclosure further provide an electronic device capable of implementing the above methods. An electronic device 1400 according to such exemplary embodiments of the present disclosure is described below with reference to FIG. 14. The electronic device 1400 shown in FIG. 14 is only an example, and should not limit the functions and scope of use of the embodiments of the present disclosure.

Figure 14:
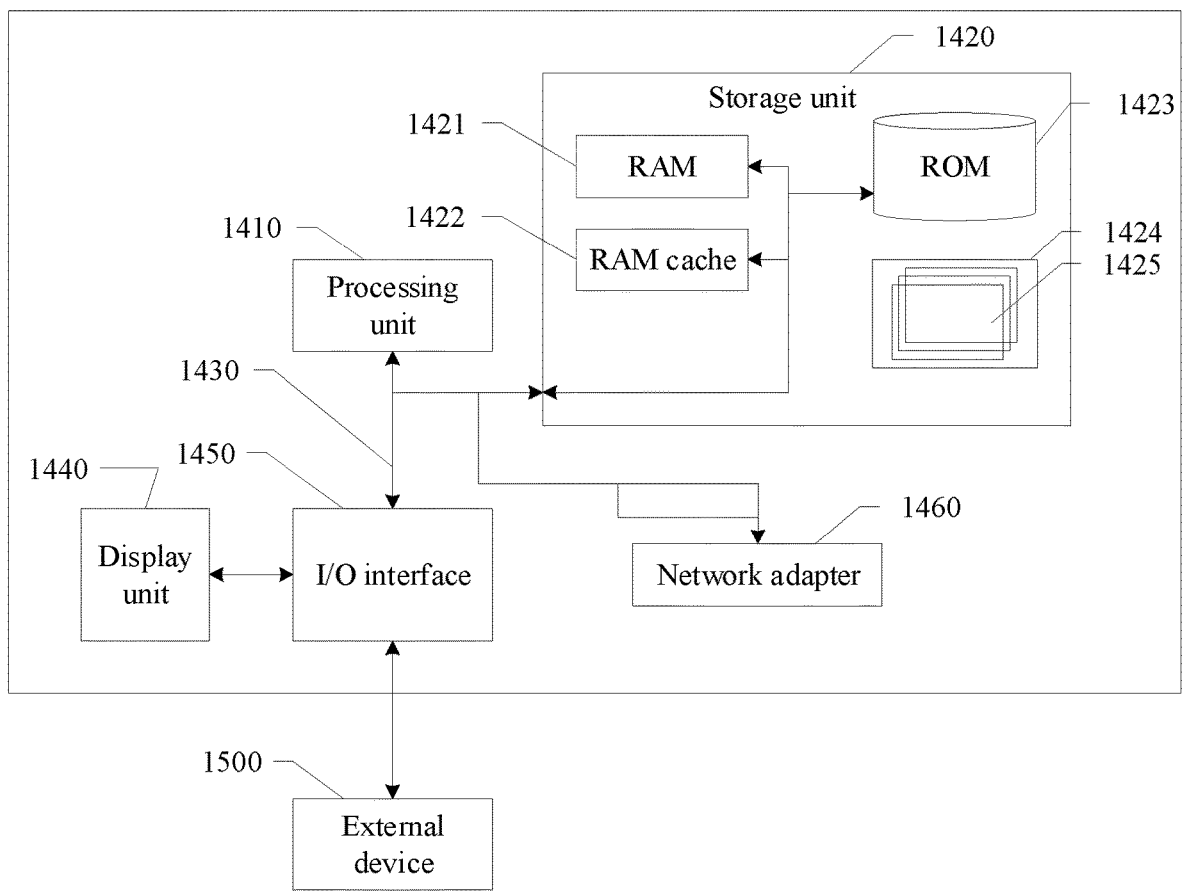
FIG. 14 shows a schematic structural diagram of a computer system suitable for implementing an electronic device according to embodiments of the present disclosure.

As shown in FIG. 14, electronic device 1400 may take the form of a general-purpose computing device. Components of the electronic device 1400 may include, but are not limited to: at least one processing unit 1410, at least one storage unit 1420, a bus 1430 connecting different system components (including the storage unit 1420 and the processing unit 1410), and a display unit 1440.

The storage unit 1420 stores program codes, which can be executed by the processing unit 1410, so that the processing unit 1410 executes the steps described in the above "Exemplary Methods" section of the description according to various exemplary embodiments of the present disclosure. For example, the processing unit 1410 may execute any one or more steps of the method in FIG. 2 to FIG. 9.

The storage unit 1420 may include a readable medium in the form of a volatile storage unit, such as a random access storage unit (RAM) 1421 and/or a RAM cache storage unit 1422, and may further include a read-only storage unit (ROM) 1423.

The storage unit 1420 may also include a program/utility 1424 having a set (at least one) of program modules 1425, such program modules 1425 including but not limited to: an operating system, one or more applications, other program modules, and program data. Implementations of networked environments may be included in each or some combination of these examples.

Bus 1430 may represent one or more of several types of bus structures, including a memory unit bus or memory unit controller, a peripheral bus, an accelerated graphics port, a processing unit, or a local area bus using any bus structure of a variety of bus structures.

The electronic device 1400 can also communicate with one or more external devices 1500 (such as keyboards, pointing devices, Bluetooth devices, etc.), and can also communicate with one or more devices that enable a user to interact with the electronic device 1400, and/or communicate with any device (e.g., router, modem, etc.) that enables the electronic device 1400 to communicate with one or more other computing devices. Such communication may be performed through input/output (I/O) interface 1450. Moreover, the electronic device 1400 can also communicate with one or more networks (such as a local area network (LAN), a wide area network (WAN) and/or a public network, e.g. the Internet) through the network adapter 1460. As shown, network adapter 1460 communicates with other modules of electronic device 1400 via bus 1430. It should be appreciated that although not shown, other hardware and/or software modules may be used in conjunction with electronic device 1400, including but not limited to: microcode, device drivers, redundant processing units, external disk drive arrays, RAID systems, tape drives and data backup storage system, etc.

In some embodiments, the method for training a vector model and the method for generating a negative sample described in the present disclosure may be executed by the processing unit 1410 of the electronic device. In some embodiments, more than one RNA sequence and protein sequence and the training data set for training each model can be input through the input interface 1450. For example, more than one RNA sequence and protein sequences and the training data set for training each model are input through the user interface of the electronic device. In some embodiments, partial/all training parameters, partial/all intermediate results or final results can be output through the output interface 1450. For example, the first RNA vector, the first protein vector, the similarity of RNA-RNA pair, the similarity of protein-protein pair, etc. are output to the external device 1500 for the user to view.

Through the description of the above embodiments, those skilled in the art can easily understand that the example embodiments described here can be implemented by software, or by combining software with necessary hardware. Therefore, the technical solutions according to the embodiments of the present disclosure can be embodied in the form of software products, and the software products can be stored in a non-volatile storage medium (which can be CD-ROM, U disk, mobile hard disk, etc.) or on the network, including several instructions to make a computing device (which may be a personal computer, a server, a terminal device, or a network device, etc.) execute the method according to the exemplary embodiments of the present disclosure.

In addition, the above-mentioned drawings are only schematic illustrations of processes included in the method according to the exemplary embodiments of the present disclosure, and are not for the purpose of limitation. It is easy to understand that the processes shown in the above drawings do not imply or limit the chronological order of these processes. In addition, it is also easy to understand that these processes may be executed, for example, synchronously or asynchronously in more than one module.

It should be noted that although several modules or units of the device for action execution are mentioned in the above detailed description, the division is not mandatory. Actually, according to the embodiment of the present disclosure, the features and functions of two or more modules or units described above may be embodied in one module or unit. Conversely, the features and functions of one module or unit described above can be further divided to be materialized by more than one module or unit.

It should be understood that the present disclosure is not limited to the precise constructions which have been described above and shown in the drawings, and various modifications and changes may be made without departing from the scope of it. The scope of the present disclosure is limited only by the appended claims.

What is claimed is:

1. A method for training a vector model, comprising:
   obtaining at least one Ribonucleic acid (RNA) sequence and at least one protein sequence;
   obtaining at least one first RNA vector by vectorizing the at least one RNA sequence;
   obtaining at least one first protein vector by vectorizing the at least one protein sequence;
   determining an interaction between the RNA sequence and the protein sequence according to the first RNA vector and the first protein vector;
   obtaining a similarity of at least one RNA-RNA pair by calculating a distance between any two RNA sequences;
   obtaining a similarity of at least one protein-protein pair by calculating a distance between any two protein sequences; and
   training the vector model according to the interaction between the RNA sequence and the protein sequence, the similarity of the RNA-RNA pair and the similarity of the protein-protein pair,
   wherein determining the interaction between the RNA sequence and the protein sequence according to the first RNA vector and the first protein vector comprises:
   calculating, according to:

$$p(1|(v^R, v^P)) = \frac{1}{1 + e^{(\theta(v^R, v^P))}},$$

a probability value of presence of the interaction between the RNA sequence and the protein sequence; and determining the interaction between the RNA sequence and the protein sequence according to the probability value; wherein, $\theta$ is a model parameter, $v^R$ is the first RNA vector, and $v^P$ is the first protein vector.

2. The method for training the vector model according to claim 1, wherein the obtaining the at least one first RNA vector by vectorizing the at least one RNA sequence comprises:
   converting each RNA sequence into N base k-mer subsequences; and
   obtaining the first RNA vector by vectorizing each of the N base k-mer subsequences.

3. The method for training the vector model according to claim 2, wherein the obtaining the first RNA vector by vectorizing each of the N base k-mer subsequences comprises:

obtaining first vectors of the N base k-mer subsequences by encoding each of the N base k-mer subsequences;

inputting the first vectors of the N base k-mer subsequences into a recurrent neural network to output N base k-mer vectors; and obtaining the first RNA vector according to the N base k-mer vectors.

4. The method for training the vector model according to claim 1, wherein the obtaining the at least one first protein vector by vectorizing the at least one protein sequence comprises:

converting each protein sequence into M amino acid k-mer subsequences; and obtaining the first protein vector by vectorizing each of the M amino acid k-mer subsequences.

5. The method for training the vector model according to claim 4, wherein the obtaining the first protein vector by vectorizing each of the M amino acid k-mer subsequences comprises:

obtaining first vectors of the M amino acid k-mer subsequences by encoding each of the M amino acid k-mer subsequences;

inputting the M amino acid k-mer subsequences into a recurrent neural network to output M amino acid k-mer vectors; and obtaining the first protein vector according to the M amino acid k-mer vectors.

6. The method for training the vector model according to claim 1, wherein the obtaining the similarity of at least one RNA-RNA pair by calculating the distance between any two RNA sequences comprises:

calculating an edit distance between any two RNA sequences, and obtaining a sequence distance between any two RNA sequences according to the edit distance; and obtaining the similarity of at least one RNA-RNA pair according to the sequence distance between any two RNA sequences.

7. The method for training the vector model according to claim 1, wherein the obtaining the similarity of at least one protein-protein pair by calculating the distance between any two protein sequences comprises:

obtaining at least one protein vector by mapping at least one protein sequence into a vector space; and obtaining the similarity of the at least one protein-protein pair by calculating a distance between any two protein vectors.

8. The method for training the vector model according to claim 1, wherein, the training the vector model according to the interaction between the RNA sequence and the protein sequence, the similarity of the RNA-RNA pair and the similarity of the protein-protein pair, comprises:

constructing an objective function according to the interaction between the RNA sequence and the protein sequence, the similarity of the RNA-RNA pair and the similarity of the protein-protein pair; and updating a model parameter of the vector model iteratively based on the objective function using a stochastic gradient descent algorithm, and completing training of the vector model when in response to determining that an iteration termination condition is satisfied.

9. A method for generating a negative sample, comprising:

obtain a positive RNA-protein pair;

obtaining, by vectorizing a target RNA sequence and a target protein sequence in the positive RNA-protein pair through a trained vector model, a corresponding second RNA vector and second protein vector; and obtaining, based on the second RNA vector and the second protein vector, a target negative RNA-protein pair corresponding to the positive RNA-protein pair.

10. The method for generating the negative sample according to claim 9, wherein the obtaining, based on the second RNA vector and the second protein vector, the target negative RNA-protein pair corresponding to the positive RNA-protein pair, comprises:

calculating a similarity between the target RNA sequence and any RNA sequence except for the target RNA sequence;

obtaining a candidate RNA sequence by screening the any RNA sequence except for the target RNA sequence according to the similarity;

calculating a relationship score between the candidate RNA sequence and the target protein sequence according to the second RNA vector of the candidate RNA sequence and the second protein vector of the target protein sequence, wherein determining the interaction between the RNA sequence and the protein sequence according to the first RNA vector and the first protein vector comprises:

calculating, according to:

$$p(1|(v^R, v^P)) = \frac{1}{1 + e^{(\theta(v^R, v^P))}},$$

a probability value of presence of the interaction between the RNA sequence and the protein sequence; and determining the interaction between the RNA sequence and the protein sequence according to the probability value; wherein, $\theta$ is a model parameter, $v^R$ is the first RNA vector, and $v^P$ is the first protein vector; and determining the target negative RNA-protein pair according to the relationship score between the candidate RNA sequence and the target protein sequence.

11. The method for generating the negative sample according to claim 10, wherein the calculating the relationship score between the candidate RNA sequence and the target protein sequence according to the second RNA vector of the candidate RNA sequence and the second protein vector of the target protein sequence comprises:

calculating the relationship score between the candidate RNA sequence and the target protein sequence, based on a model parameter of the vector model and according to the second RNA vector of the candidate RNA sequence and the second protein vector of the target protein sequence;

wherein, the model parameter is obtained by training the vector model.

12. The method for generating the negative sample according to claim 10, wherein the determining the target negative RNA-protein pair according to the relationship score between the candidate RNA sequence and the target protein sequence comprises:

obtaining, in response to determining that the relationship score between the candidate RNA sequence and the target protein sequence satisfies a preset condition, a first negative example set from the candidate RNA sequence; and determining the target negative example RNA-protein pair according to the first negative example set.

13. The method for generating the negative sample according to claim 9, wherein the obtaining, based on the second RNA vector and the second protein vector, the target negative RNA-protein pair corresponding to the positive RNA-protein pair, comprises:
    calculating a similarity between the target protein sequence and any protein sequence except for the target protein sequence;
    obtaining a candidate protein sequence by screening the any protein sequence except for the target protein sequence according to the similarity;
    calculating the relationship score between the candidate protein sequence and the target RNA sequence according to the second protein vector of the candidate protein sequence and the second RNA vector of the target RNA sequence; and
    determining the target negative RNA-protein pair according to the relationship score between the candidate protein sequence and the target RNA sequence.

14. The method for generating the negative sample according to claim 9, further comprising:
    obtaining a training data set comprising at least one RNA-protein pair;
    determining an interaction between an RNA sequence and a protein sequence in the training data set, a similarity of an RNA-RNA pair and a similarity of a protein-protein pair through the vector model;
    constructing an objective function according to the interaction between the RNA sequence and the protein sequence, the similarity of the RNA-RNA pair, and the similarity of the protein-protein pair;
    updating a model parameter of the vector model iteratively based on the objective function using a stochastic gradient descent algorithm and completing training of the vector model in response to determining that an iteration termination condition is satisfied.

15. A method for generating a negative sample, comprising:
    obtaining a positive sample, wherein the positive sample comprises two biomolecular sequences;
    obtaining, by vectorizing a first biomolecule sequence in the positive sample through a trained network model, a biomolecule vector of the first biomolecule sequence;
    calculating a similarity between the biomolecule vector of the first biomolecule sequence and a biomolecule vector of any homologous biomolecule sequence except for the first biomolecule sequence;
    determining a homologous target biomolecule sequence similar to the first biomolecule sequence according to the similarity; and
    obtaining a negative sample corresponding to the positive sample from the homologous target biomolecule sequence and a second biomolecule sequence in the positive sample,
    wherein determining the interaction between the first biomolecule sequence and the protein sequence according to the first biomolecule vector and the first protein vector comprises:
    calculating, according to:

$$p(1|(v^R, v^P)) = \frac{1}{1 + e^{(\theta(v^R, v^P))}},$$

a probability value of presence of the interaction between the biomolecule sequence and the protein sequence; and determining the interaction between the biomolecule sequence and the protein sequence according to the probability value; wherein, $\theta$ is a model parameter, $v^R$ is the first biomolecule vector, and $v^P$ is the first protein vector.

16. The method for generating the negative sample according to claim 15, wherein the first biomolecule sequence is an RNA sequence, and the biomolecule vector is a third RNA vector; and the obtaining, by vectorizing the first biomolecule sequence in the positive sample through the trained network model, the biomolecule vector of the first biomolecule sequence, comprises:
    converting each RNA sequence into N base k-mer subsequences; and
    obtaining the third RNA vector by vectorizing each of the N k-mer subsequences through the trained network model.

17. The method for generating the negative sample according to claim 16, wherein the obtaining the third RNA vector by vectorizing each of the N k-mer subsequences through the trained network model comprises:
    obtaining first vectors of the N base k-mer subsequences by encoding each of the N base k-mer subsequences;
    inputting the first vectors of the N base k-mer subsequences into a pre-trained model to output N base k-mer vectors; and
    obtaining the third RNA vector according to the N base k-mer vectors.

18. The method for generating the negative sample according to claim 16, wherein the calculating the similarity between the biomolecule vector of the first biomolecule sequence and the biomolecule vector of any homologous biomolecule sequence except for the first biomolecule sequence comprises:
    calculating, according to:

$$S(Vr_j, Vr_i) = \frac{\langle Vr_j, Vr_i \rangle}{\sqrt{\langle Vr_j, Vr_j \rangle} \sqrt{\langle Vr_i, Vr_i \rangle}},$$

a similarity between two third RNA vectors $Vr_i$ and $Vr_j$; wherein, $Vr_i$ represents the third RNA vector of the RNA sequence $r_i$, and $Vr_j$ represents the third RNA vector of the RNA sequence $r_j$.

19. The method for generating the negative sample according to claim 15, wherein the first biomolecular sequence is a protein sequence, and the biomolecular vector is a third protein vector; and the obtaining, by vectorizing the first biomolecule sequence in the positive sample through the trained network model, the biomolecule vector of the first biomolecule sequence, comprises:
    converting each protein sequence into M amino acid k-mer subsequences; and
    obtaining the third protein vector by vectorizing each of the M amino acid k-mer subsequences through the trained network model.

* * * * *